United States Patent
Fok et al.

(10) Patent No.: US 9,288,078 B2
(45) Date of Patent: Mar. 15, 2016

(54) APPARATUS AND METHODS FOR MANAGING CONTENT EXCHANGE ON A WIRELESS DEVICE

(75) Inventors: Kenny Fok, San Diego, CA (US); Tia Manning Cassett, San Diego, CA (US); Jihyun Hwang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 11/369,377

(22) Filed: Mar. 6, 2006

(65) Prior Publication Data

US 2006/0256012 A1    Nov. 16, 2006

Related U.S. Application Data

(60) Provisional application No. 60/665,305, filed on Mar. 25, 2005.

(51) Int. Cl.
*H04M 3/00* (2006.01)
*H04L 12/58* (2006.01)
(Continued)

(52) U.S. Cl.
CPC .............. *H04L 12/585* (2013.01); *G06F 21/56* (2013.01); *G06F 21/566* (2013.01); *H04L 51/12* (2013.01); *H04M 15/00* (2013.01); *H04M 15/8088* (2013.01); *H04W 4/24* (2013.01); *G06F 2221/2101* (2013.01); *G06F 2221/2149* (2013.01); *H04L 12/5855* (2013.01); *H04L 12/5895* (2013.01)

(58) Field of Classification Search
CPC ........... H04W 4/12; H04W 4/14; H04W 4/18; H04W 12/00; H04W 12/12; H04W 12/10; H04W 12/585
See application file for complete search history.

(56) References Cited

U.S. PATENT DOCUMENTS 5,987,611 A    11/1999  Freund
6,182,118 B1    1/2001  Finney et al.
(Continued)

FOREIGN PATENT DOCUMENTS

CN    1178951 A    4/1998
DE    10021686    11/2001
(Continued)

OTHER PUBLICATIONS

International Search Report and Written Opinion—PCT/US2006/011656, International Search Authority—European Patent Office—Nov. 20, 2006.
(Continued)

*Primary Examiner* — Vladimir Magloire
*Assistant Examiner* — Shantell L Heiber

(57) ABSTRACT

Apparatus, methods, computer readable media and processors operable on a wireless device may provide an anti-spam engine operable to intercept content intended for and/or generated by client applications, and filter out unwanted content. The anti-spam engine may include a configurable module having a spam filter that may determine whether content is unwanted. Based on the result of subjecting the content to the spam filter, the anti-spam engine may forward the content to the intended client application and/or a network destination, and/or may generate a spam log. The anti-spam module may be further operable to forward the spam log to another device, such as a user manager device, operable to analyze the log and generate a report which may be viewable by an operator.

56 Claims, 12 Drawing Sheets

(51) Int. Cl.
*G06F 21/56* (2013.01)
*H04M 15/00* (2006.01)
*H04W 4/24* (2009.01)

(56) References Cited

U.S. PATENT DOCUMENTS

| | | | |
|---|---|---|---|
| 6,819,932 B2 | 11/2004 | Allison | |
| 7,237,008 B1 * | 6/2007 | Tarbotton et al. | 709/206 |
| 7,505,759 B1 | 3/2009 | Rahman | |
| 7,647,376 B1 * | 1/2010 | Jagger et al. | 709/206 |
| 7,756,929 B1 * | 7/2010 | Pettigrew et al. | 709/206 |
| 2002/0138762 A1 | 9/2002 | Horne | |
| 2003/0023873 A1 | 1/2003 | Ben-Itzhak | |
| 2003/0083078 A1 | 5/2003 | Allison et al. | |
| 2003/0097590 A1 * | 5/2003 | Syvanne | 713/201 |
| 2004/0181462 A1 * | 9/2004 | Bauer et al. | 705/26 |
| 2004/0230644 A1 | 11/2004 | Aratake | |
| 2004/0235503 A1 * | 11/2004 | Koponen et al. | 455/466 |
| 2005/0022010 A1 | 1/2005 | Swander et al. | |
| 2005/0048998 A1 * | 3/2005 | Zhu | 455/550.1 |
| 2005/0050222 A1 | 3/2005 | Packer | |
| 2005/0060643 A1 | 3/2005 | Glass | |
| 2005/0101306 A1 * | 5/2005 | Zabawskyj et al. | 455/414.1 |
| 2005/0250520 A1 * | 11/2005 | Johnson et al. | 455/466 |
| 2006/0259543 A1 * | 11/2006 | Tindall | 709/203 |

FOREIGN PATENT DOCUMENTS

| | | |
|---|---|---|
| DE | 10114649 | 10/2002 |
| EP | 1279262 A1 | 1/2003 |
| JP | 11272582 A | 10/1999 |
| JP | 2001527257 A | 12/2001 |
| JP | 2002290900 A | 10/2002 |
| JP | 2003513541 A | 4/2003 |
| JP | 2003150482 A | 5/2003 |
| JP | 2004062416 A | 2/2004 |
| JP | 2004178541 A | 6/2004 |
| JP | 2004348292 A | 12/2004 |
| JP | 2004362581 A | 12/2004 |
| JP | 2005071359 A | 3/2005 |
| WO | 0133781 A1 | 5/2001 |
| WO | WO0209437 A2 | 1/2002 |
| WO | 03045021 A1 | 5/2003 |
| WO | 2004008701 A1 | 1/2004 |
| WO | WO2004059959 A1 | 7/2004 |
| WO | 2005001733 | 1/2005 |
| WO | 2005099198 A1 | 10/2005 |

OTHER PUBLICATIONS

European Search Report—EP08158183—Search Authority—Munich—Sep. 12, 2008.

Andoh, T., "How to Fight against Annoying Enemies!", Nikkei Pasokon, Japan, Nikkei Business Publications, Inc., Feb. 2, 2004, No. 450, pp. 94-103.

Fukuda, T., "Block Spam," Nikkei Internet Technology, Japan, Nikkei Business Publications, Inc., Jul. 22, 2002, No. 61, pp. 16-17.

Nakada, A., "US-originated Measures against Spam are Coming to Japan one after another," Nikkei Windows Pro, Japan, Nikkei Business Publications, Inc., Jan. 1, 2004, No. 82, pp. 11-13.

Nakai, N., "How to Block Unsolicited Emails," Asahi Pasokon, Japan, Asahi Shimbun Publishing Co., Jun. 15, 2004, No. 361, pp. 62-69.

* cited by examiner

APPARATUS AND METHODS FOR MANAGING CONTENT EXCHANGE ON A WIRELESS DEVICE

CLAIM OF PRIORITY UNDER 35 U.S.C. §119

The present Application for Patent claims priority to Provisional Application No. 60/665,305 entitled "Methods and Apparatus for Preventing Unauthorized Downloads to a Wireless Device," filed Mar. 25, 2005, assigned to the assignee hereof and hereby expressly incorporated by reference herein.

FIELD OF INVENTION

The described embodiments generally relate to wireless communication devices and computer networks, and more particularly relate to apparatus and methods for detecting unauthorized content on a wireless device.

BACKGROUND

Wireless networking connects one or more wireless devices to other computer devices without a direct electrical connection, such as a copper wire or optical cable. Wireless devices communicate data, typically in the form of packets, across a wireless or partially wireless computer network and open a "data" or "communication" channel on the network such that the device can send and receive data packets. The wireless devices often have wireless device resources, such as programs and hardware components, which individually and cooperatively operate to use and generate data in accordance to their design and specific protocol or configuration, such as using open communication connections to transmit and receive data on the network.

Wireless devices are being manufactured with increased computing capabilities and are becoming tantamount to personal computers and include such features as Internet browsing, instant messaging ("IM"), E-mail, and text messaging, including Short Message Service and Multimedia Messaging Service ("SMS/MMS"). Because such features facilitate direct contact with a wireless device user, these messaging clients have become targets for unauthorized, unsolicited, and in most cases unwanted, messages and/or viruses, herein referred to as "spam."

Spamming may be loosely defined as the use of any electronic communications medium to send unsolicited messages and/or viruses in bulk and by definition, occurs without the permission of the recipient. While its use is usually limited to indiscriminate bulk mailing and not any targeted marketing, the term "spam" can refer to any commercially oriented, unsolicited bulk mailing perceived as being excessive and undesired. Although the most common form of spam is that delivered in E-mail, spammers have developed a variety of spamming techniques, which vary by media: E-mail spam, instant messaging spam, Usenet newsgroup spam, Web search engines spam, weblogs spam, and mobile phone messaging spam.

Spam by E-mail is a type of spam that involves sending identical (or nearly identical) messages to thousands (or millions) of recipients. Spammers often harvest addresses of prospective recipients from Usenet postings and/or web pages, obtain them from databases, or simply guess them by using common names and domains.

Instant messaging ("IM") systems, such as Yahoo! Messenger, AIM, MSN Messenger and ICQ, are popular targets for spammers. Many IM systems offer a directory of users, including demographic information such as age and sex. Advertisers can gather this information, sign on to the system, and send unsolicited messages.

Mobile phone spam, in some forms, includes spamming directed at mobile phone text messaging services and can be especially irritating to users not only for the inconvenience but also because they may have to pay to receive the unsolicited and often unwanted text message. Mobile phone spam may also include any type of content that can be received by a mobile phone, such as audio content, video content, software programs, etc., and combinations thereof.

Several methods of message analysis to protect networks from spam include fingerprinting and rules-based scoring. Fingerprinting technology takes a "digital picture" of each message and matches it against known profiles of spam messages to detect unwanted email and flag it as spam. Rule-based scoring involves scoring messages against a database of spam rules, assigning scores to messages based on unique characteristics of spam and legitimate email. When a score of a message exceeds a defined threshold, it is flagged as spam.

The approach to anti-spam filtering at the wireless user device level, has for the most part, been accomplished by incorporating an anti-spam module within each messaging client application. However, if anti-spam code is integrated within each client application, e.g., E-mail, MMS, SMS, and IM, much valuable handset storage/memory is wasted doing essentially the same function, that being anti-spam filtering.

Furthermore, if the functionality of an anti-spam module is limited to filtering spam after being received by the wireless device, the filtering does nothing to address the equally if not more important issue of network congestion due to a flood of spam traversing the network. A network, accurately sized for a certain bandwidth of legitimate traffic (plus a little extra) may be hard pressed to maintain the designed-to quality-of-service in the presence of millions of instances spam content directed to an equally large and growing number of wireless devices hosting several content consuming client applications.

Accordingly, it would be advantageous to provide an apparatus and method that provides a single ubiquitous anti-spam module that may be configured to monitor all content incoming to a wireless device prior to being received by any client application. Furthermore, it would be advantageous to provide an apparatus and method operable to analyze the effect of the spam filtering on the wireless device with the goal of blocking further spam attacks.

SUMMARY

The described embodiments comprise apparatus, methods, computer readable media and processors operable on a wireless device to provide a single ubiquitous anti-spam detection mechanism capable of filtering out unwanted content, such as unauthorized and/or unsolicited content and/or viruses, i.e., spam, within a data stream received from a wireless network and intended for a client application resident on the wireless device, and/or within a data stream generated on the wireless device and intended for transmission to a remote device on the wireless network.

Furthermore, such apparatus and methods may include the forwarding of information regarding the detected unwanted content to a user manager and/or operator for further analysis and report generation. Furthermore, the network carrier may be informed of the unwanted content for the purpose of blocking the future propagation of unwanted content throughout the network.

In some aspects, a method for filtering content on a wireless device comprises intercepting content on the wireless device prior to delivery of the content to a content destination. The method further comprises analyzing the content based on a content filter to determine if the content comprises unwanted content, wherein the content filter is selected from a plurality of content filters based on at least one of a network service provider associated with the wireless device, a hardware characteristic associated with the wireless device, a predetermined characteristic associated with the content destination, and a hardware requirement associated with the content. Additionally, the method comprises, based upon the analyzing of the content, forwarding the content to the content destination or quarantining the content. In other aspects, at least one processor may perform the above-defined actions. In yet other aspects, a machine-readable medium may comprise instructions which, when executed by a machine, cause the machine to perform the above-defined operations.

In some other aspects, a wireless device comprises means for intercepting content on the wireless device prior to delivery of the content to a content destination. The wireless device further comprises means for analyzing the content based on a content filter to determine a content classification, wherein the content filter is selected from a plurality of content filters based on at least one of a network service provider associated with the wireless device, a hardware characteristic associated with the wireless device, a predetermined characteristic associated with the content destination, and a hardware requirement associated with the content. Additionally, the wireless device comprises means for forwarding the content to the content destination or quarantining the content, based upon the content classification.

In yet other aspects, a wireless device comprises an anti-spam engine operable to intercept content on the wireless device prior to delivery of the content to a content destination, the anti-spam engine comprising a content filter selected from a plurality of content filters based on at least one of a network service provider associated with the wireless device, a hardware characteristic associated with the wireless device, a predetermined characteristic associated with the content destination, and a hardware requirement associated with the content. Additionally, the wireless device comprises control logic associated with the anti-spam engine and operable to apply the content filter to the content and determine if the content comprises unwanted content, wherein the control logic is further operable to forward the content to the content destination if the content does not comprise unwanted content or quarantine the content if the content comprises unwanted content.

In still further aspects, a method for managing the filtering of content on a wireless device comprises providing a predetermined content filter and a reporting parameter to the wireless device and receiving, based on the reporting parameter, a spam log relating to content on the wireless device and subjected to the predetermined content filter. Further, the method comprises generating a report based on the spam log. In other aspects, at least one processor may perform the above-defined actions. In yet other aspects, a machine-readable medium may comprise instructions which, when executed by a machine, cause the machine to perform the above-defined operations.

In other aspects, an apparatus for managing the filtering of content on a wireless device comprises means for providing a predetermined content filter and a reporting parameter to the wireless device, and means for receiving, based on the reporting parameter, a spam log relating to content received by the wireless device and subjected to the content filter. Additionally, the apparatus comprises means for generating a report based on the spam log.

In further aspects, an apparatus for managing the filtering of content on a wireless device comprises a generator module operable to generate a content filter configuration comprising at least one predetermined content filter and a reporting parameter. Further, the apparatus comprises an anti-spam module operable to forward the content filter configuration to the wireless device and operable to receive, based on the reporting parameter, a spam log relating to content received by the wireless device and subjected to the spam filter. Additionally, the apparatus comprises a report generator operable to generate a report based on the spam log.

BRIEF DESCRIPTION OF THE DRAWINGS

The disclosed embodiments will hereinafter be described in conjunction with the appended drawings provided to illustrate and not to limit the disclosed embodiments, wherein like designations denote like elements, and in which.

DETAILED DESCRIPTION

Figure 1:
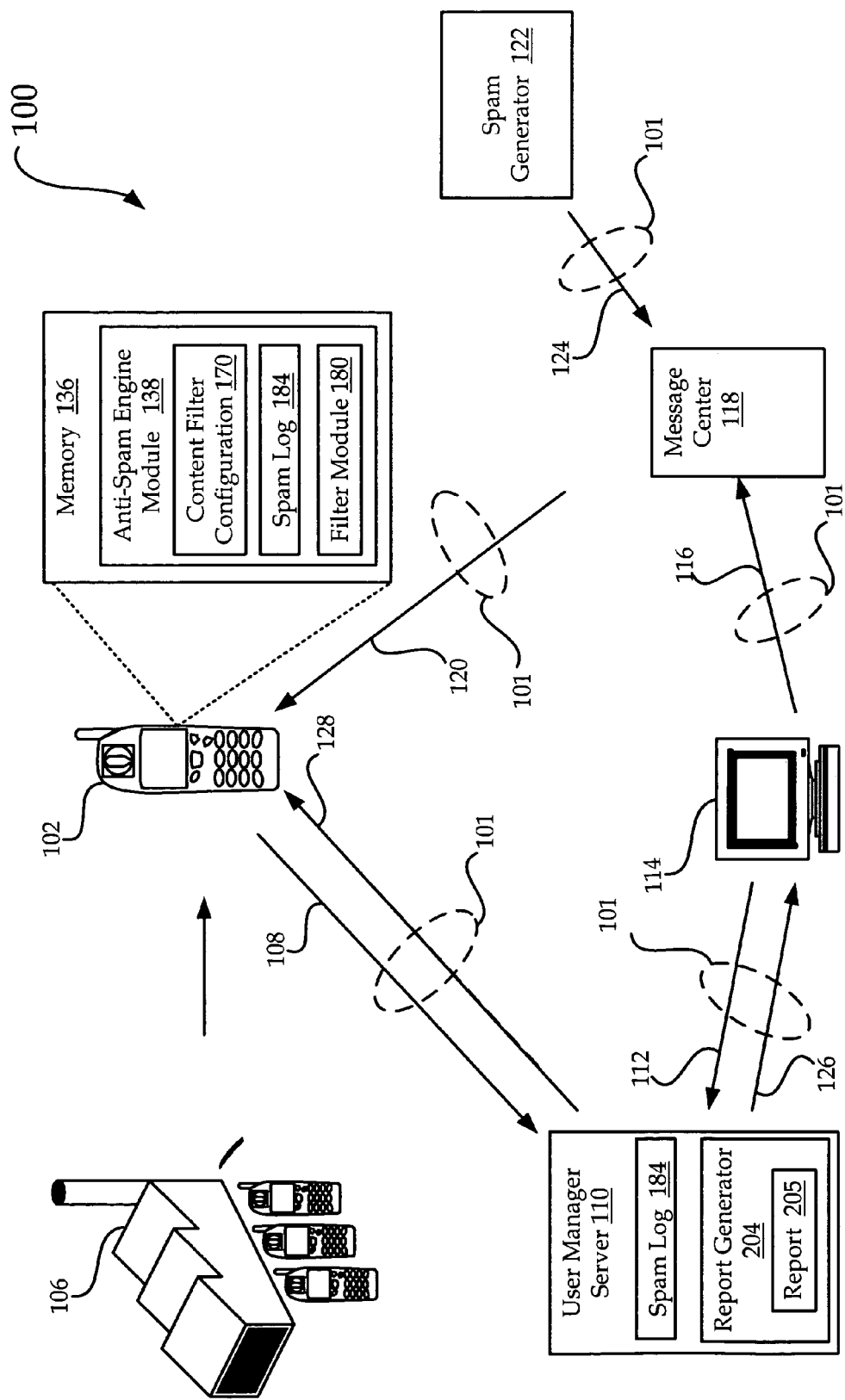
FIG. 1 is a schematic diagram of one aspect of a system for preventing predetermined content from being received by and/or sent from client applications on a wireless device.

Referring to FIG. 1, a system 100 for detecting unwanted content on a wireless device, including preventing the receipt and/or transmission of such content, may comprise a wireless device 102 operable to receive a content filter configuration 170 from a user manager 110. Unwanted content, or spam, may include unauthorized or unsolicited content and/or viruses. Content filter configuration 170 defines parameters for the filtering of content using filter module 180, for the recording of details associated with filtered content in a spam log 184, and for the forwarding of log 184 to the user manager 110 or another device for analysis.

For example, an operator workstation 114 may be configured to receive a spam report 205 generated by a report generator 204 associated with user manager 110 and may further be configured to communicate future spam blocking instructions 116 to a message center 118. Communication between wireless device 102, user manager 110, operator workstation 114, and message center 118 may be accomplished via network 101.

Content filter configuration 170, and corresponding filter module 180, may include one or more content filters to apply to incoming and/or outgoing content. The content filter utilized by wireless device 102 may be selected from a plurality of content filters based on, for example, at least one of a network service provider associated with the wireless device, a hardware characteristic associated with the wireless device, a predetermined characteristic associated with the content destination, and a hardware requirement associated with the content.

For example, wireless device 102 may operate on a home wireless network provided by a network service provider, but the device may roam out of the home network into another wireless network under the control of another network service provider. Since spam may affect the performance of the given wireless network, each wireless service provider may define and provide a custom content filter to be used by any wireless device operating on their wireless network.

In another example, the content filter may vary depending on the hardware characteristics of a given wireless device. For instance, a hardware characteristic such a processor type/capability, speaker type/capability, ringer type/capability, display type/capability, and a memory type/capability may affect whether or not a given wireless device can efficiently process a given content. For example, a given content comprising a given ring tone may require sounds not capable of being generated by a given ringer associated with a given wireless device, and thus the given content may be considered spam for the given device. Thus, a given content that adversely affects a hardware characteristic of one wireless device may be classified as spam for that device, while the same content may be classified as not spam for another wireless device having different hardware characteristics.

Similarly, the content filter may vary depending on a predetermined characteristic associated with the content destination. For instance, in the case of incoming content received by the wireless device, the predetermined characteristic associated with the content destination may comprise, for example, an identification of a destination client application resident on the wireless device. In other words, content defined or classified as spam may vary depending upon whether the content is destined for a browser as opposed to a text messaging client. In the case of outgoing content intended from transmission from the wireless device, the predetermined characteristic associated with the content destination may comprise, for example, a number content destinations associated the content. In other words, sending of more than a predetermined number of copies of the same content may be defined as spamming.

Similarly, the content filter may vary depending on a hardware requirement associated with the content. For instance, the hardware requirement may comprise, for example, at least one of a wireless device processor type/capability/capacity usage, an audio component type/capability/usage, a video component type/capability/usage, and a wireless device memory type/capability/usage. In other words, for example, spam may be defined as requiring more than a predetermined amount of the total capacity of a given wireless device hardware resource. By using too much capacity, a given content may adversely affect the overall performance of the wireless device, and/or may affect the performance of other applications executing on the wireless device.

Wireless device 102 may include any type of computerized device such as a cellular telephone, personal digital assistant, two-way text pager, portable computer, and even a separate computer platform that has a wireless communications portal, and which also may have a wired connection to a network or the Internet. The wireless device can be a remote-slave, or other device that does not have an end-user thereof, but simply communicates data across the wireless network 101, such as remote sensors, diagnostic tools, and data relays.

Wireless device 102 includes an anti-spam engine module 138 that monitors incoming and/or outgoing content and filters out unwanted, unsolicited and/or unauthorized content and/or viruses, collectively referred to as spam. Anti-spam module 138 may be loaded into a memory 136 of wireless device 102 in a number of ways, including but not limited to: statically installed at the factory 106; by wireless transmission over a wireless network, such as network 101; and, over a hardwired connection, such as via a personal computer (PC). Wireless device 102 may be delivered to a network carrier and/or some other retailer for sale and delivery to a user and activation on a network.

Once a wireless device 102 is activated by a carrier, application clients and wireless device components/ports/interfaces for sending and receiving content may be operable on the wireless device 102. For example, application clients may include, but are not limited to, clients such as instant messaging ("IM"), E-mail, and messaging clients, such as a Short Message Service (SMS) client and a Multimedia Messaging Service (MMS) client, and a browser. Wireless device components/ports/interfaces may include any point of content entry into, and/or any point of content exit from wireless device, as will be discussed in more detail below. Targeting these client applications and components/ports/interfaces, advertisers and other spam generators 122 of unsolicited communications may then gain access to network 101 and obtain the address information of wireless device 102. Armed with such information, such as a phone number and/or Internet Protocol (IP) address, a spam generator 122 may start sending spam 124 to the wireless device 102 via message center 118 and wireless link 120. Spam 124 may be any content that is unsolicited, unwanted, and/or unauthorized by the user of wireless device 102 and/or by the operator and/or network service provider associated with network 101. Furthermore, spam, intentionally or unintentionally generated by a client application, may be transmitted to the network, thereby degrading network availability.

Anti-spam engine module 138 is operable to intercept all incoming content and/or all outgoing content, and to filter out content determined to be unauthorized and/or unsolicited and/or unwanted and/or a virus based upon configurable parameters to be discussed in detail herein.

In one aspect, the anti-spam engine 138 may quarantine the detected spam in a quarantine folder and may generate a spam log with details of the detected spam. Further, in another aspect, based upon a configurable reporting parameter, the anti-spam engine 138 may transmit the spam log to the user manager 110 over wireless link 108.

The user manager 110 may receive the log, analyze the data and generate a report. The user manager 110 may, for example, E-mail the report over communication channel 126 to an operator workstation 114, or otherwise make the contents of the report viewable to an operator.

The operator may analyze the report and, based upon that analysis, may issue a command 112 to the user manager 110 with instructions to update the anti-spam engine 138, for example, to update the filtering characteristics of the engine to detect new forms of spam. Furthermore, the operator workstation 114 may transmit instructions 116 to the message center 118 to block further access of spam generator 122 to the network 101.

Figure 2:
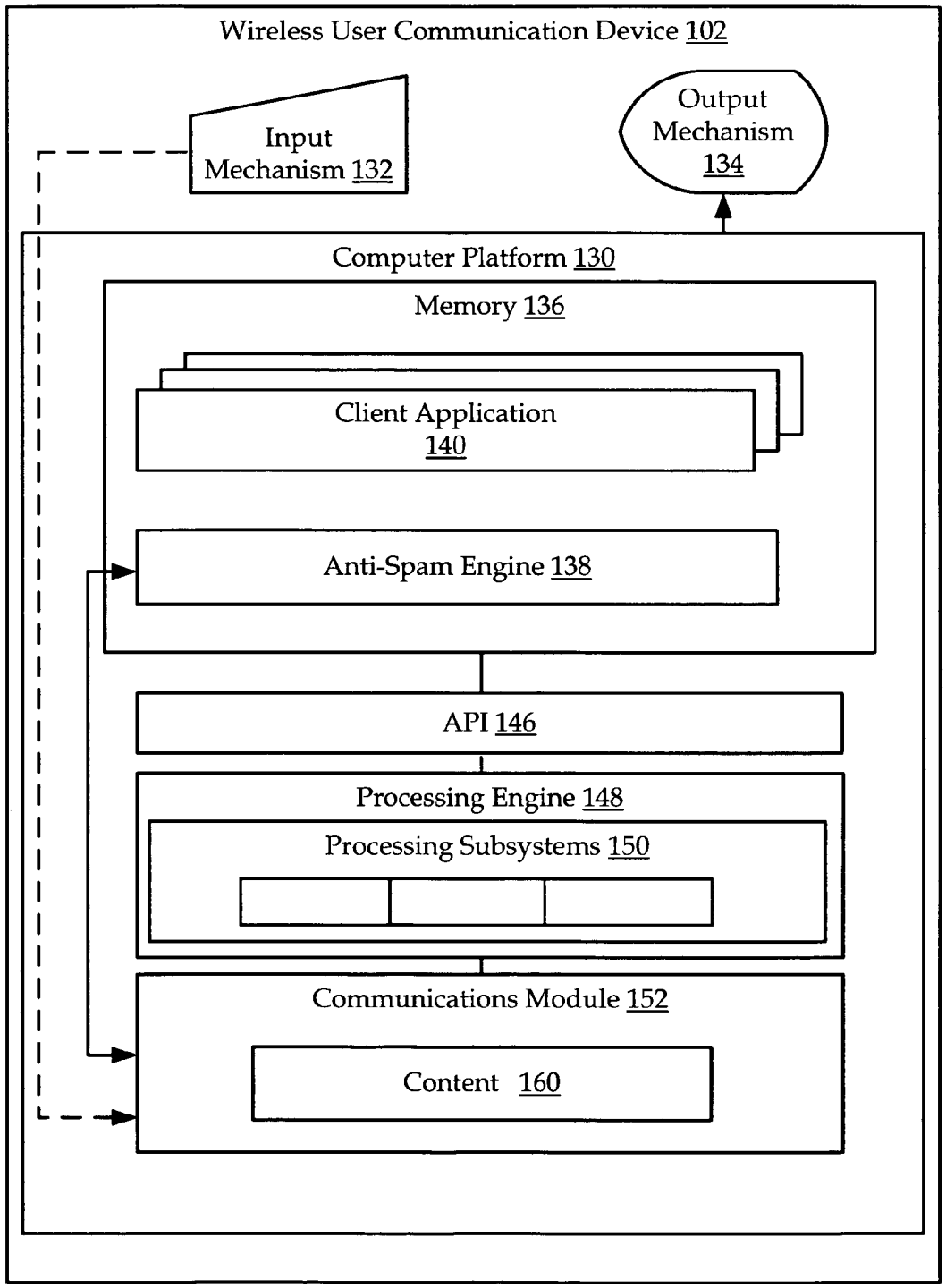
FIG. 2 is a schematic diagram of one aspect of a wireless device according to FIG. 1.

Referring to FIG. 2, wireless device 102 may comprise a computer platform 130 interconnected with an input mechanism 132 and an output mechanism 134 respectively providing inputs and outputs for communicating with resident applications. For example, input mechanism 132 may include, but is not limited to, a mechanism such as a key or keyboard, a mouse, a touch-screen display, and a voice recognition module. Output mechanism 134 may include, but is not limited to, a display, an audio speaker, and a haptic feedback mechanism.

Computer platform 130 may further include a communications module 152 embodied in hardware, software, firmware, executable instructions data and combinations thereof, operable to receive/transmit and otherwise enable communication between components within the wireless device 102, as well as to enable communications between the wireless device 102 and other devices, such as serially connected devices as well as devices connected via an air interface, such as network 101. Communications module 152 receives content 160, either from one or more client applications 140 and/or from input mechanism 132 on wireless device 102 and/or from another device in communication with wireless device 102, and cooperates with anti-spam engine 138 to analyze content 160 before allowing the content to be transmitted from and/or received by the wireless device.

As noted above, communications module 152 may comprise any component/port/interface that may include any point of content entry into, and/or any point of content exit from wireless device. As such, communications module 152 may include interface components for hardwired communications and for wireless communications. For example, communications module 152 may include, but is not limited to, communication interface components such as a serial port, a universal serial bus (USB), a parallel port, and air interface components for wireless protocols/standards such as Wi-Fi, World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network, public heterogeneous communications network such as the Internet, private wireless communications networks, land mobile radio networks, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple access (OFDMA), global system for mobile communications (GSM), single carrier (1X) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Computer platform 130 may also include memory 136, which may comprise volatile and nonvolatile memory such as read-only and/or random-access memory (RAM and ROM), EPROM, EEPROM, flash cards, or any memory common to computer platforms. Further, memory 136 may include one or more flash memory cells, or may comprise any secondary or tertiary storage device, such as magnetic media, optical media, tape, or soft or hard disk.

Memory 136 may be operable to store one or more client applications 140, including, but not limited to: a web browser client; an IM client; a messaging client, such as a SMS text messaging client and/or a MMS multimedia messaging client; and an E-mail client.

Furthermore, anti-spam engine 138 may be stored in memory 136 and is operable to intercept content 160 received by the communications module 152 that, in the absence of anti-spam engine 138, would be forwarded directly from the communications module 152 to a respective content destination, such as a resident client application and/or a remote device located across a wireless network. With anti-spam engine 138 in place, content determined to be spam may be blocked, while legitimate content may be forwarded to the respective content destination. It should be noted that anti-spam engine 138 may be configured to filter all content 160 received by communications module 152, or only selected content received from selective sources/interfaces, for example, only content for one or more predetermined client applications 140 and/or only content received at a predetermined port such as a USB.

Further, computer platform 130 may include a processing engine 148, which may be an application-specific integrated circuit ("ASIC"), or other chipset, processor, logic circuit, or other data processing device. Processing engine 148 is operable to execute an application programming interface ("API") layer 146 that may interface with any resident programs, such as the anti-spam engine 138, and client applications 140.

In one non-limiting aspect, API 146 is a runtime environment executing on the respective wireless device. One such runtime environment is Binary Runtime Environment for Wireless® (BREW(g) software developed by Qualcomm, Inc., of San Diego, Calif. Other runtime environments may be utilized that, for example, operate to control the execution of applications on wireless computing devices.

Still referring to FIG. 2, processing engine 148 may include one or a combination of processing subsystems 150 that provide functionality to wireless device 102. In a cellular phone example, processing subsystems 150 may include subsystems such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc.

Non-limiting, processing subsystems 150 may include any subsystem components that interact with applications executing on computer platform 130. For example, processing subsystems 150 may include any subsystem components that receive data reads and data writes from API 146 on behalf of the resident anti-spam engine 138 and any other memory resident client application 140.

Figure 3:
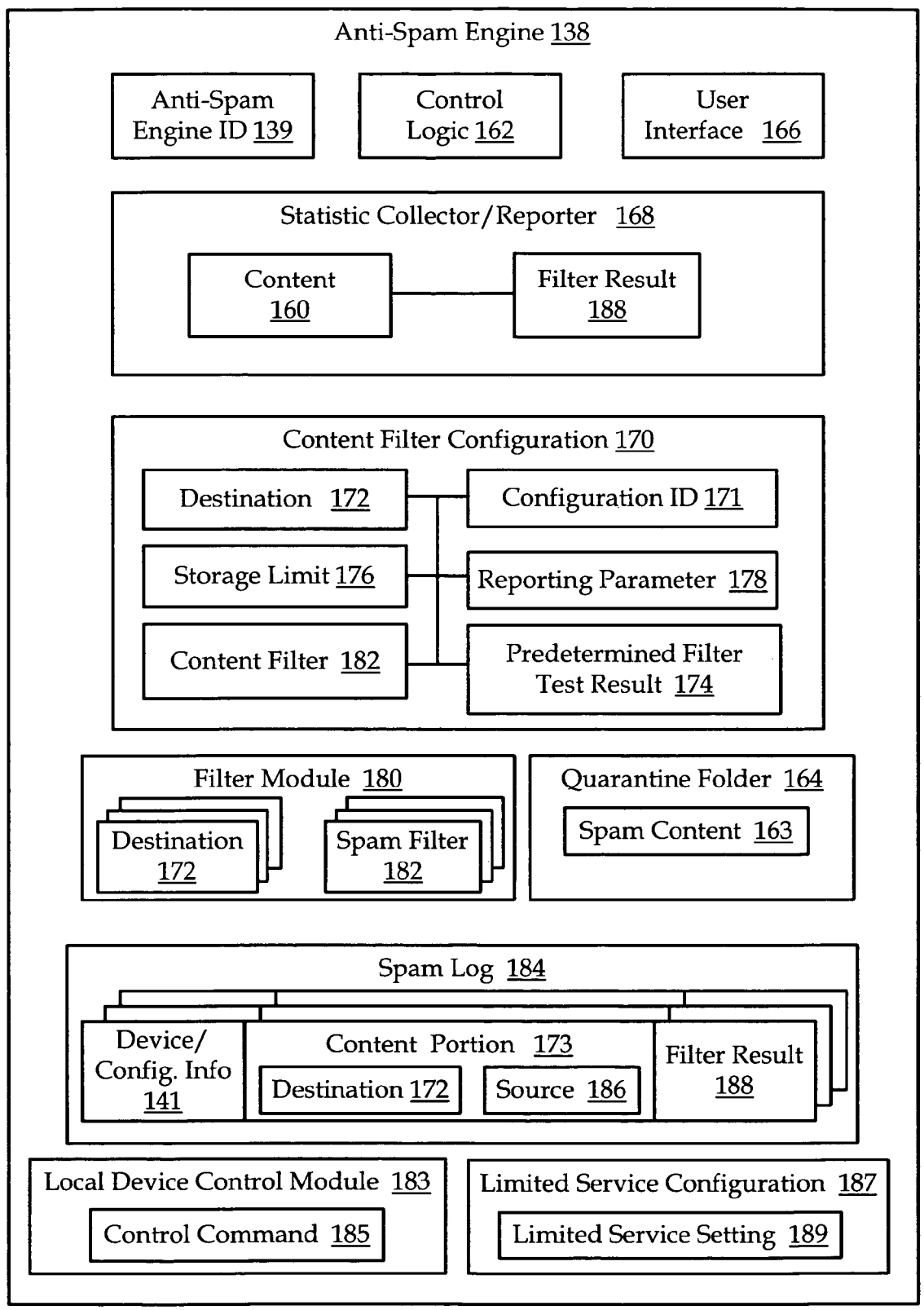
FIG. 3 is a schematic diagram of one aspect of a memory resident anti-spam engine according to the wireless device of FIG. 2.

Referring to FIG. 3, anti-spam engine 138 may monitor and analyze content generated by, and/or designated for receipt by, any client application 140. Anti-spam engine 138 may be any one or a combination of hardware, software, firmware, executable instructions and data.

The anti-spam engine 138 may comprise an anti-spam engine identification (ID) 139 that identifies the anti-spam engine, and control logic 162 operable to manage all functions and components of the anti-spam engine 138. For example, anti-spam engine ID 139 may include one or more of a name, a version, etc. Further, anti-spam engine 138 may include a content filter configuration file 170 that defines a content filter 182 to apply to incoming content. For example, content filter 182 may be a filter mechanism included in a content filter configuration file 170, may be a reference to a remotely-stored filter mechanism, or may be an identification of a filter mechanism stored within filter module 180 resident on wireless device 102. Further, control logic 162 in conjunction with statistic collector/reporter module 168, is operable to apply the designated content filter 182 to content 160 and identify or classify the content as being spam or non-spam, and further collect information associated with the filtering and classification operations. Additionally, anti-spam engine 138 may store filtered content in a quarantine folder 164, and may store at least portions of the filtered content and/or additional content-related information in a spam log 184 that is used to report the activity of anti-spam engine 138. Further, anti-spam engine 138 may include a User Interface ("UI") 166 that assists a user, such as a local user of wireless device 102 or a remotely located user in communication with wireless device 102, in operating anti-spam engine 138.

For example, UI 166, in conjunction with the input mechanism 132, may be operable by the end user to configure at least a portion of the capabilities of the anti-spam engine 138, including content filtering, reporting, quarantining, and disposing of detected spam.

Besides being configurable by the user, the content filter configuration file 170 may be downloaded to memory 136 via wireless transmission over a wireless network 101, statically installed by the OEM 106 (FIG. 1) at the time of manufacture, and downloaded via hardwired connection to a personal computer (PC). For example, content filter configuration file 170 may be set by an operator associated with a network service provider and transmitted to wireless device 102 via user manager server 110.

Content filter configuration file 170 may include any combination of one or more sets of parameters that dictate the spam filtering, recording and reporting activities to be performed by wireless device 102. For example, content filter configuration file 170 may include a set of parameters to apply to all content, regardless of the destination of the content. Alternatively, content filter configuration file 170 may include a destination-specific set of parameters corresponding to one or more of the resident client applications 140 (FIG. 2) capable of receiving content from network 101, and/or one or more content destinations on wireless network 101.

As such, in some aspects, content filter configuration file 170 may include one or more of the following parameters: a content destination 172 which identifies a client application 140 and/or a network device on wireless network 101 corresponding to the given set of parameters, such that the given set of parameters are applied to content designated for the corresponding content destination; a content filter 182 that identifies a content filter to be applied to the corresponding content; a predetermined filter test result 174 associated with the given content filter and/or the content destination, where the predetermined filter test result 174 is a limit that is compared to a filter test result generated by applying content filter 182 to incoming and/or outgoing content, and where the predetermined filter test result 174 defines spam and non-spam content; a storage limit parameter 176 associated with quarantined spam content, for example, storage limit parameter 176 may indicate a number of days to keep quarantined content before automatically deleting the content, and/or may indicate a maximum amount of memory to be utilized to store quarantined content; a reporting parameter 178 which defines what information to log corresponding to any detected spam, when to forward the log for analysis, to whom to forward the log and/or whom to allow access to the log; and a configuration identification (ID) 171, such as one or more of a name, a version, etc., that identifies the given set of parameters associated with the given configuration.

Anti-spam engine 138 may be operable based upon at least one of several spam detection mechanisms, referred to herein as content filter 182. In some aspects, content filter 182 comprises a software mechanism for classifying content 160 as either spam or not spam. In some aspects, content 160 may be run through content filter 182 to produce a filter test result 188, which is calculated based upon a predetermined set of rules, i.e. the filter mechanism.

There are many techniques for classifying content as spam or as not spam. These techniques are represented by content filter 182 and include, but are not limited to: host-based filtering; rule-based filtering; Bayesian statistical analysis; noise filters; and Sender Policy Framework ("SPF") or Sender Identification (ID) filters. Host-based and rule-based filters, for example, examine content for "spam-markers" such as common spam subjects, known spammer addresses, known mail forwarding machines, or simply common spam phrases. In one aspect, such as in cases when the content comprises a message, the header and/or the body of the message may be examined for these markers. Another method is to classify as spam all content from unknown addresses.

Bayesian filtering compares content that others have received to find common spam content, and accomplishes this by tokenizing a large corpus of spam and a large corpus of non-spam. The theory behind Bayesian filtering is that certain tokens will be common in spam content and uncommon in non-spam content, and certain other tokens will be common in non-spam content and uncommon in spam content. When content is to be classified, it is tokenized to see whether the tokens are more like those of spam content or those of non-spam content.

Noise filters are a form of Bayesian filters that target spam containing numerous random words rarely used in sales promotions. Spammers hope to thwart Bayesian filters by minimizing promotion language and by making the spam appear to be personal correspondence. There are three primary steps employed by Bayesian noise reduction filters. The first step is pattern learning, where patterns are created and their disposition learned by the filter. The second step may use the patterns learned and performs "dubbing" or elimination of tokens whose disposition is inconsistent with the pattern of text they belong to. The third step may perform concurrent elimination of data from the sample up to a stop marker. Once a stop marker has been reached, certain checks may be performed on the length of the concurrent elimination to determine if the elimination should be made permanent.

Sender Policy Framework ("SPF") or Sender Identification (ID) filters protects against return-path address forgery and makes it easier to identify spoofs. SPF operates by having domain owners identify sending mail servers in domain name servers ("DNS"). SMTP receivers verify the envelope sender address against this information, and can distinguish authentic content from forgeries before any content data is transmitted.

Furthermore, because large files may have an adverse affect on the wireless device 102, such as by using memory or processing capability, or on the network 101, such as by using bandwidth, content may be identified as spam based upon the size of the content transmitted to/from the wireless device 102.

Any one or any combination of the filtering mechanisms disclosed herein may be incorporated within filter module 180 to detect unwanted content. Furthermore, any filter 182 within filter module 180 may be associated with a specific content destination 172, thereby enabling the anti-spam engine 138 to select specific filters within filter module 180 to apply against a particular content 160 based upon the intended destination.

For example, control logic 162 is operable to parse the parameters from content filter configuration file 170, and in conjunction with the statistic collector/reporter 168, which may include any combination of hardware, software, firmware, data and executable instructions, is operable to monitor and analyze all content 160 received by and/or generated for transmission from wireless device 102. In yet other embodiments, only content 160 having a given content destination 172 may be intercepted for processing by the anti-spam engine 138. Further, in some embodiments, the same content filter 182 may be applied to all content 160.

In other embodiments, different spam filters 182 may be applied to different content 160 based on, for example, at least one of a network service provider associated with the wireless device, a hardware characteristic associated with the wireless device, a predetermined characteristic associated with the content destination, and a hardware requirement associated with the content, as discussed in detail above.

Regardless of the source and destination of monitored content, anti-spam engine 138 applies a specific content filter 182 to each content 160, generates calculated filter test result 188, compares result 188 with the corresponding predetermined filter test result 174, and classifies the given content 160 as spam content 163 or as authorized content. If classified as spam content 163, anti-spam engine 138 may then store the content in quarantine folder 164 and/or may automatically delete the content depending upon storage limit 176. If not classified as spam, then anti-spam engine 138 initiates the delivery of content 160 to the intended content destination 172.

Further, for spam content 163, statistic collector/reporter 168 is operable to collect and save user-defined and/or content filter configuration-defined information based on reporting parameter 178. For instance, statistic collector/reporter 168 may log: device/configuration information 141, such as one or a combination of anti-spam engine ID 139 and/or content filter configuration 171, for example, to identify how content 160 was filtered, and wireless device information such as hardware and software information, for example, information identifying the model of the device, the resident hardware, the resident software, the state of selected hardware and/or software components, etc. and generally any information that may be useful in troubleshooting or determining a diagnostic status of wireless device 102; all or a selected portion 173 of the given content 160 and/or information associated with the content, including but not limited to: the calculated filter test result 188; the content destination 172; and source information 186 identifying the originator of the content and including, for example, a URL, a telephone number, a MAC address, an E-mail address of the spam generator 122, and a an identification of the generating client application 140 on the wireless device. The collected/calculated information may be saved in memory 136 as part of spam log 184, where the size of the spam log 184 may be, in one aspect, configurable as well.

Furthermore, for content 160 classified as spam content 163 and stored in a separate quarantine folder 188, anti-spam engine 138 may alert a user of wireless device 102 of their presence in order to initiate review of these content. Further, anti-spam engine 138 may track a storage space used and/or a time in storage and automatically delete spam content 163 based on storage limit parameter 176. The actions of reviewing and/or deleting spam content 163 may be recorded in spam log 184 is dictated by reporting parameter 178.

Through use of UI 166, the user may have access to all configurable parameters with the additional capability of marking specific content as unauthorized, i.e. placing the content into the quarantine folder 188, retrieving content previously designated as unauthorized content 163 from quarantine folder 188, and controlling what spam elements to log and when to upload log 184. For example, a user may update content filter 182 upon reviewing unauthorized content 163 and providing an input that identifies the given content as authorized content. For instance, the user may identify the source 186 of the given content as a non-spammer and/or an authorized source of content, and content filter 182 may be updated accordingly.

Reporting parameter 178 may configure statistic collector/reporter 168 to selectively transmit log file 184 to user manager 110 across wireless network 101. The timing of log transmission is non-limiting and may be transmitted at a predetermined time, a predetermined interval, and on an occurrence of a predetermined event, such as upon detection of at least one unauthorized content or upon request by an authorized remote device, such as user manager 110 or operator workstation 114. Further, reporting parameter 178 may determine to whom to allow local access to log 170, thereby allowing a remote device such as the user manager 110 access to memory 136.

In one non-limiting aspect, spam log 170 may be transmitted over an open communication connection between the wireless device 102 and the wireless network 101. For example, anti-spam engine 138 may "piggyback" spam log 170 onto an ongoing voice or data call across an open connection. Alternatively, in a cellular network configuration, anti-spam engine 138 may transmit spam log 170 to user manager 110 through short message service ("SMS"). Furthermore, as noted above, user manager 110 may "pull" log 170 from the wireless device 102 across the network 101 on a scheduled or ad hoc basis.

Non-limiting, anti-spam engine module 138 may also include a local wireless device control module 183. Under control of control logic 162, local wireless device control module 183 may execute a locally or remotely generated control command 185 on the wireless device 102. The local device control module 183 may request authorization of a control command 185 before its execution.

For example, control command 185 may be any operation executable on wireless device 102 including, but not limited to, receiving and activating a content filter configuration file 170 downloaded from the network 101 and uploading log file 184 to the network 101.

Further, anti-spam engine module 138 may include a limited service configuration 187 operable to establish a limited-access communications channel across the wireless network 101 generally not available to the user of wireless device 102. For example, the limited-access communications channel may be used for transmitting log file 184, receiving a content filter configuration file 170, as well as for receiving/generating control command 185.

The identification and set-up of the limited-access communications channel may be based on a limited service setting 189. Limited service setting 189 may identify the type of communications that are allowed, and may identify the associated communication channels that can be utilized. Limited service configuration 187 may be received over the wireless network 101, may be locally transferred to wireless device 102, such as through a serial connection, or may be preloaded on the wireless device 102.

Figure 4:
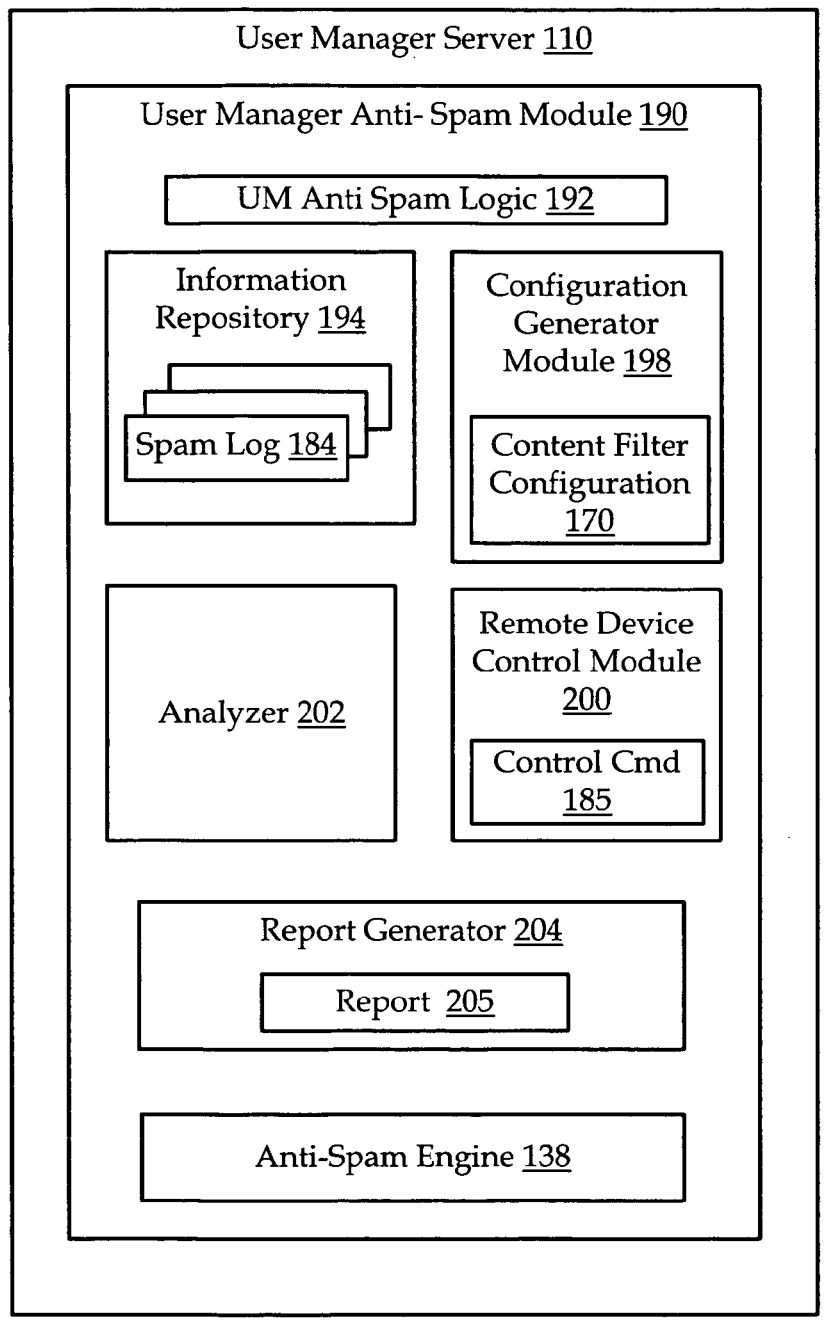
FIG. 4 is a schematic diagram of one aspect of a user manager according to the system of FIG. 1.

Referring to FIG. 4, user manager 110 may be a server, personal computer, mini computer, mainframe computer, or any computing device operable to analyze and take proactive measures to block spam from the network 101. In some aspects, user manager 110 may operate in conjunction with operator workstation 114 to perform these functions. The user manager 110 may comprise user manager anti-spam module 190, which may include at least one of any type of hardware, software, firmware, data and executable instructions operable to generate content filter configuration file 170 and analyze spam log 184 from wireless device 102.

Furthermore, there may be separate servers or computer devices associated with user manager 110 working in concert to provide data in usable formats to parties, and/or provide a separate layer of control in the data flow between the wireless device 102 and user manager anti-spam module 190. User manager 110 may send software agents or applications to wireless device 102 across wireless network 101, such that the wireless device 102 returns information from its resident applications and subsystems 150.

Figure 5:
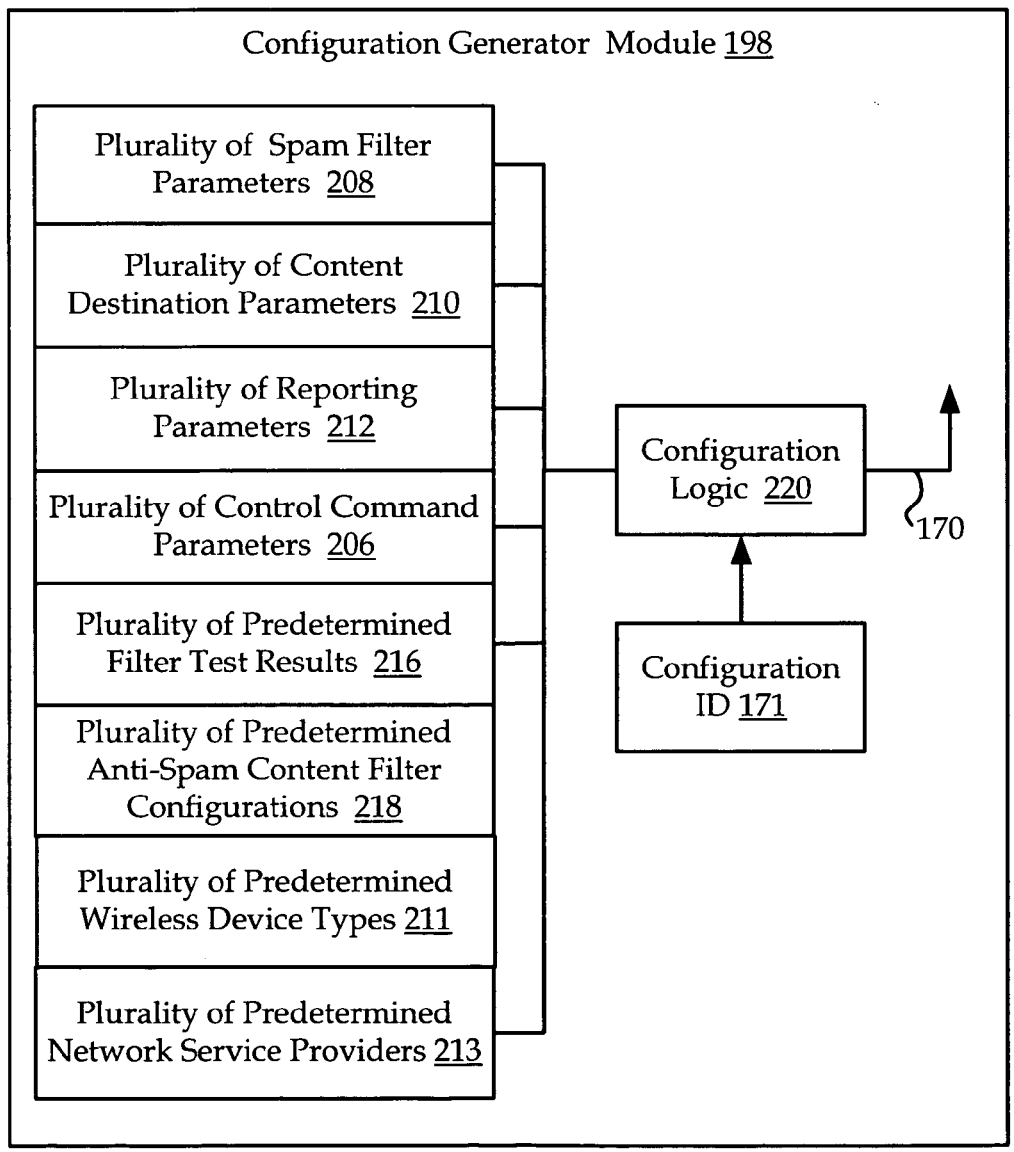
FIG. 5 is a schematic diagram of one aspect of a configuration generator module according to the user manager of FIG. 4.

Referring to FIGS. 4 and 5, user manager anti-spam module 190 may include a configuration generator module 198 that comprises hardware, content, software and/or any other associated logic allowing configuration generator module 198 to generate content filter configuration file 170. In one aspect, configuration generator module 198 may be operable to assemble the various components of a given content filter configuration file 170 based on selections from a number of configurable parameters.

For example, configuration logic 220 may provide an authorized user with the ability to select from a menu of a plurality of content filters 208, i.e., host-based filtering, rule-based filtering, Bayesian statistical analysis, noise filters, and Sender Policy Framework ("SPF") or Sender ID filters.

In addition, configuration logic 220 may provide an authorized user with the ability to select from a menu of a plurality of content destinations 210, including but not limited to resident client applications 140 on wireless device 102 and network devices on network 101, in order to generate content filter configuration file 170.

Similarly, configuration logic 220 may provide an authorized user with the ability to select from a menu of at least one of a plurality of reporting parameters 212, a plurality of control command parameters 206, and a plurality of predetermined filter score result values 216. Alternatively, rather than selecting the various configuration parameters individually, configuration logic 220 may provide an authorized user with the ability to select from a menu of a plurality of predetermined content filter configurations 218, which may include predetermined groupings of the above-noted parameters that comprise content filter configuration 170.

Furthermore, what may be considered as spam by one network carrier may not be considered spam by another network carrier. Accordingly, configuration logic 220 may provide an authorized user with the ability to select from a menu of a plurality of predetermined network providers 219 to thereby associate a given configuration with a given network service provider. As such, different filtering configurations may be generated for different network providers, and a device roaming from one provider to the next may resultingly receive a new filtering configuration and filter out different content depending on the network provider.

In addition, identification of spam may be dependent upon the specific wireless device in operation. For example, since spam may be based on the size of the content, the use of more than a predetermined portion of memory may cause content to be classified as spam. In this case, since different wireless devices have different memory sizes, such a spam definition may be device-specific. Other examples may be based on the processing ability, the graphics ability, etc. of the given wireless device. Accordingly, configuration logic 220 may provide an authorized user with the ability to select from a menu of a plurality of predetermined wireless device types 213.

Once the specific parameters of a given content filter configuration 170 are determined, then configuration logic 220 may assign unique configuration ID 171 to the given configuration, and may store this configuration in a library for later recall, such as among plurality of predetermined anti-spam content filter configurations 218. Further, configuration logic 220, and/or another component of user manager anti-spam module 190, may be operable to transmit configuration 170 to one or more wireless devices 102. In some embodiments, a command 185 may be transmitted to activate the transmitted configuration 170, or the anti-spam engine 138 on the wireless device itself may be configured to activate the newly transmitted configuration upon download.

User manager anti-spam module 190 may include information repository 194 for storing one or more spam logs 184 from one or more wireless devices 102. Information repository 194 may include any type of memory or storage device compatible with user manager anti-spam module 190.

In addition, user manager anti-spam module 190 may comprise analyzer 202 and report generator 204. Analyzer 202 may include hardware and analysis logic, such as decision-making routines, statistical programs, and combinations thereof, for analyzing and interpreting logs 184 and generating report 205. Furthermore, user manager anti-spam module 190 may be operable to make report 205 available for viewing by an authorized user, as well as to generate and transmit an E-mail message, including at least portions of report 205, to a networked device, such as to operator workstation 114. For example, report 205 may group unauthorized content 163 based on predetermined parameters, such as the originator/sender, the destination wireless device and/or client application, some portion of the content, such as a word, name or file, etc.

Figure 6:
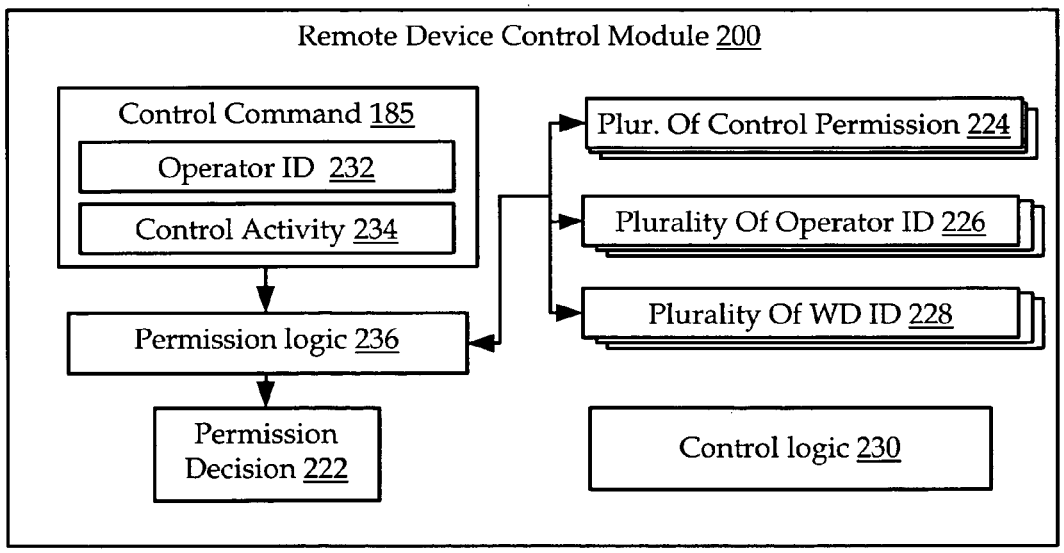
FIG. 6 is a schematic diagram of one aspect of a device control module according to the user manager of FIG. 4.

Referring to FIG. 6, the user manager anti-spam module 190 may further comprise a remote device control module 200 operable, by execution of control logic 230, to receive/generate control command 185 to/from operator workstation 114 and/or wireless device 102. For example, control command 185 may comprise operator identification ("ID") 232 and a control activity 234. Operator ID 232 may be some manner of identifying the originator of control command 185. For example, operator ID 234 may be a name, a number, a digital signature, a hash, or any other type of data or value that may be associated with an authorized user. Further, operator ID 232 may not be explicitly contained in the control command 185, but rather derived from the origin of control command 185.

Control activity 234 may be the operation to be performed on wireless device 102 by anti-spam engine module 138 through executing control command 185. As mentioned above, the operation may include downloading configuration 170 and uploading log 184. Before executing or forwarding the control command 185, remote device control module 200 may execute permission logic 236 to verify the authenticity or authority of the party issuing control command 185.

For instance, certain operators may be restricted to certain control activities, or restricted to controlling certain wireless devices. The authorization of a control command 185 may simply be a prompt to operator workstation 114 to confirm whether operator workstation 114 actually wishes to execute control activity 234 on wireless device 102. Alternatively, permission logic 236 may parse operator ID 232 and control activity 234 from control command 185 and correlate these parameters with a database of a plurality of operator IDs 226, a plurality of control permissions 224 and a plurality of wireless device identifications (IDs) 228, in order to generate a permission decision 222.

It should be noted, however, that the plurality of operator IDs 270, the plurality of control permissions 224 and the plurality of wireless device identifications (IDs) 228 may be correlated in any manner. For example, control command 185 may contain an operator ID 232 and a control activity 234 of "update content filter configuration file" for a particular one of the plurality of wireless device identifications 228. Permission logic 236 may search the database of control permissions 224 and operator IDs 226 to determine if the operator was permitted to "push" a new configuration on the given wireless device 102.

Figure 7:
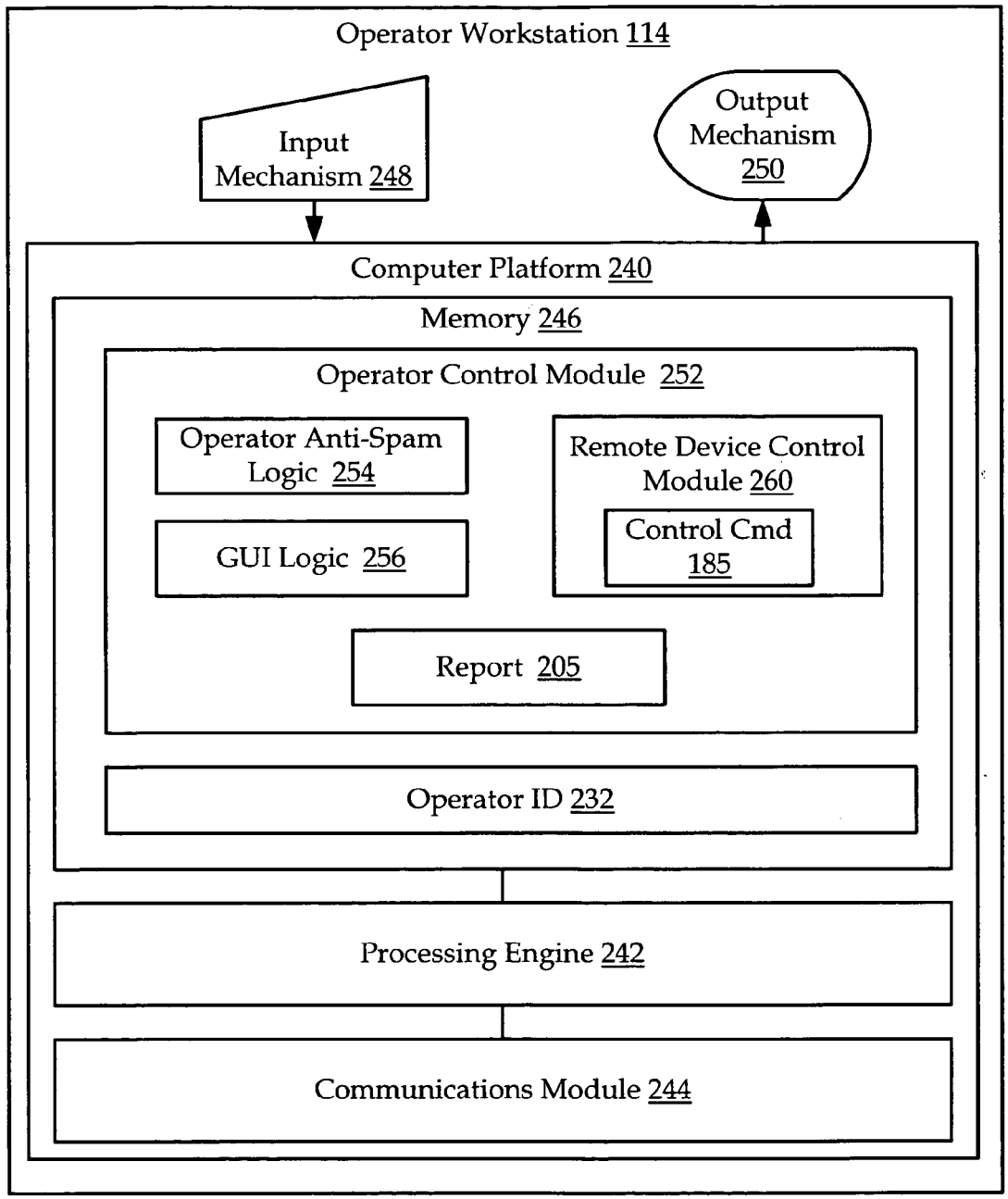
FIG. 7 is a schematic diagram of one aspect of an operator workstation according to the system of FIG. 1.

Referring now to FIG. 7, operator workstation 114 may be operable to enable an authorized user to review report 205, communicate with a user of wireless device 102, download the anti-spam engine 138 and/or content filter configuration file 170 to wireless device 102, and upload the spam log 184 from the wireless device 102. Furthermore, the operator, though the operation of the operator workstation 114, may be operable to request that the message center 118 block specific spam from accessing the network 101.

Operator workstation 114 may comprise an input mechanism 248, and an output mechanism 250 interconnected to a computer platform 240. The input mechanism 248 and the output mechanism 250 may be similar to their respective counterparts, 132 and 134, on wireless device 102.

The operator workstation 114 may further comprise a memory 246 for storing applications and data files, a processing engine 242, and a communications module 244 operable to transmit and receive content between the operator workstation 114, the user manager 110, wireless device 102, as well as any network component on wireless network 101. Furthermore, the communications module 244 may be operable to transmit voice over the network 101, thereby allowing an operator to engage in voice communications with any wireless device user or other authorized personnel.

Memory 246 may comprise an operator control module 252 made executable by processing engine 242. As the number of operator workstations 114 and the number of operators are non-limiting, an operator ID parameter 232, previously discussed in reference to FIG. 6, may be entered into memory 246 to log in to the network 101 and identify that operator to network components.

The operator control module 252 may itself comprise operator anti-spam logic 254 operable in conjunction with Graphic User Interface (GUI) logic 256, input mechanism 248, and output mechanism 250, to guide the operator through any spam analysis and command activity selection and transmission. The GUI logic 256 may control, for example, browser communications, E-mail communication, text messaging, voice communication, report presentation, as well providing a menu for selecting and transmitting any control command 185 to the user manager 110 and wireless device 102.

The operator control module 252 may further comprise a remote device control module 260 similar to the remote device control module 200 of the user manager module 190. Similar to the remote device control module 200, the operator-based remote device control module 260 may generate a control command 185 operable on the wireless device 102 to perform a variety of activities, including, but not limited to: uploading log 184, downloading anti-spam engine 138 and/or configuration 170.

Although the user of operator workstation 114 may normally be a person, the workstation 114 may be a computing device comprising hardware, software, content, and combinations thereof for analyzing and responding to report 205 or to an external communication such as from the user of the wireless device 102. Such software may include algorithms, decision-making routines, statistical programs, etc. for analyzing and interpreting report 205. Further, as with the user manager anti-spam module 190, the operator workstation 114 may reside on any network device of wireless network 101, such as on user manager 110, another server connected to the network, or even on a wireless device 102.

Referring to FIG. 1, wireless network 101 may include any communications network operable, at least in part, for enabling wireless communications between wireless device 102 and any other device connected to wireless network 101. Further, wireless network 101 may include all network components and all connected devices that form the network. For example, wireless network 101 may include at least one, or any combination, of: a cellular telephone network; a terrestrial telephone network; a satellite telephone network; an infrared network such as an Infrared Data Association ("IrDA")-based network; a short-range wireless network; a Bluetooth® technology network; a ZigBee® protocol network; an ultra wide band ("UWB") protocol network; a home radio frequency ("HomeRF") network; a shared wireless access protocol ("SWAP") network; a wideband network, such as a wireless Ethernet compatibility alliance ("WECA") network, a wireless fidelity alliance ("Wi-Fi Alliance") network, and a 802.11 network; a public switched telephone network; a public heterogeneous communications network, such as the Internet; a private communications network; and land mobile radio network.

Suitable examples of telephone networks include at least one, or any combination, of analog and digital networks/technologies, such as: code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network.

Referring back to FIG. 1, message center 118 may include a processor, a memory and a middleware program disposed in the memory, the middleware program operable to handle content sent for use by other programs using a messaging application program interface (API). A messaging center can usually queue and prioritize content as needed and saves each of the client programs from having to perform these services.

Figure 8:
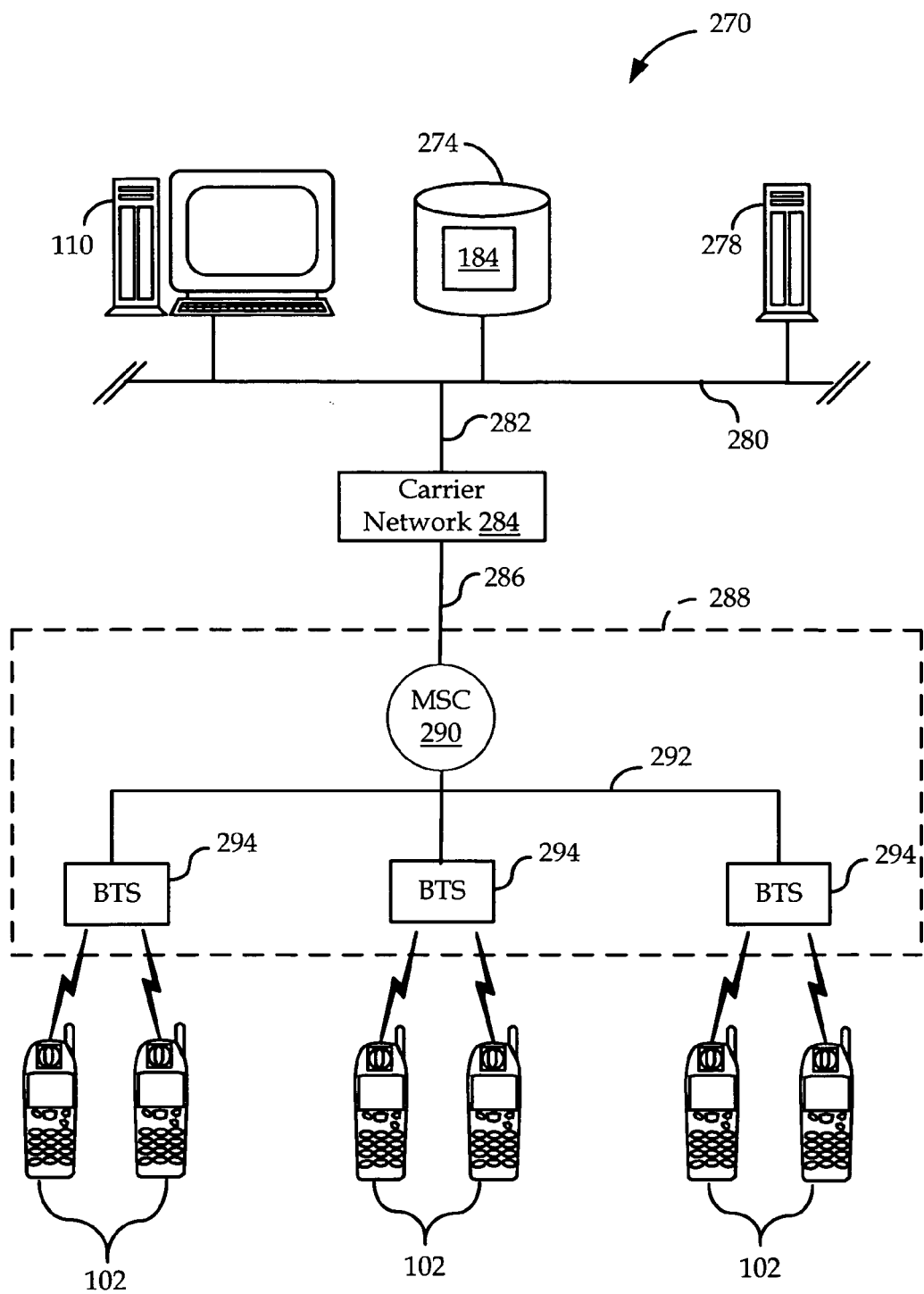
FIG. 8 is a schematic diagram of one aspect of a cellular telephone network according to FIG. 1.

FIG. 8 illustrates a non-limiting cellular telephone system 270 and comprises at least one wireless device 102 and a cellular wireless network 288 connected to a wired network 280 via a wireless carrier network 284. Cellular telephone system 270 is merely exemplary and may include any system whereby remote modules, such as wireless devices 102 communicate packets including voice and data over-the-air between and among each other and/or between and among components of wireless network 288, including, without limitation, wireless network carriers and/or servers.

According to system 270, user manager 110 may communicate over the wired network 280 (e.g. a local area network, LAN) with data repository 274 for storing spam information, such as spam log 184, gathered from the wireless device 102. Further, a data management server 278 may be in communication with user manager 110 to provide post-processing capabilities, data flow control, etc. User manager 110, data repository 274 and data management server 278 may be present along with any other network components needed to provide cellular telecommunication services. It is through the user manager 272, the data repository 274, and the data management server 278, that spam detected by the wireless device 102 may result in the carrier network 284 eventually blocking the detected spam from wireless devices 102 and/or network 288.

User manager 110, and/or data management server 278 may communicate with the carrier network 284 through data links 282 and 286, such as the Internet, a secure LAN, WAN, or other network. Carrier network 284 may control the transmission of content (generally being data packets) sent to a mobile switching center ("MSC") 290. Further, carrier network 284 communicates with MSC 290 by a network 286, such as the Internet, and/or POTS ("plain old telephone service"). Typically, in network 286, a network or Internet portion transfers data, and the POTS portion transfers voice information.

MSC 290 may be connected to multiple base stations ("BTS") 294 by another network 292, such as a data network and/or Internet portion for data transfer and a POTS portion for voice information. BTS 294 ultimately broadcasts content wirelessly to the wireless devices, such as wireless device 102, by short messaging service ("SMS"), or other over-the-air methods.

Figure 9:
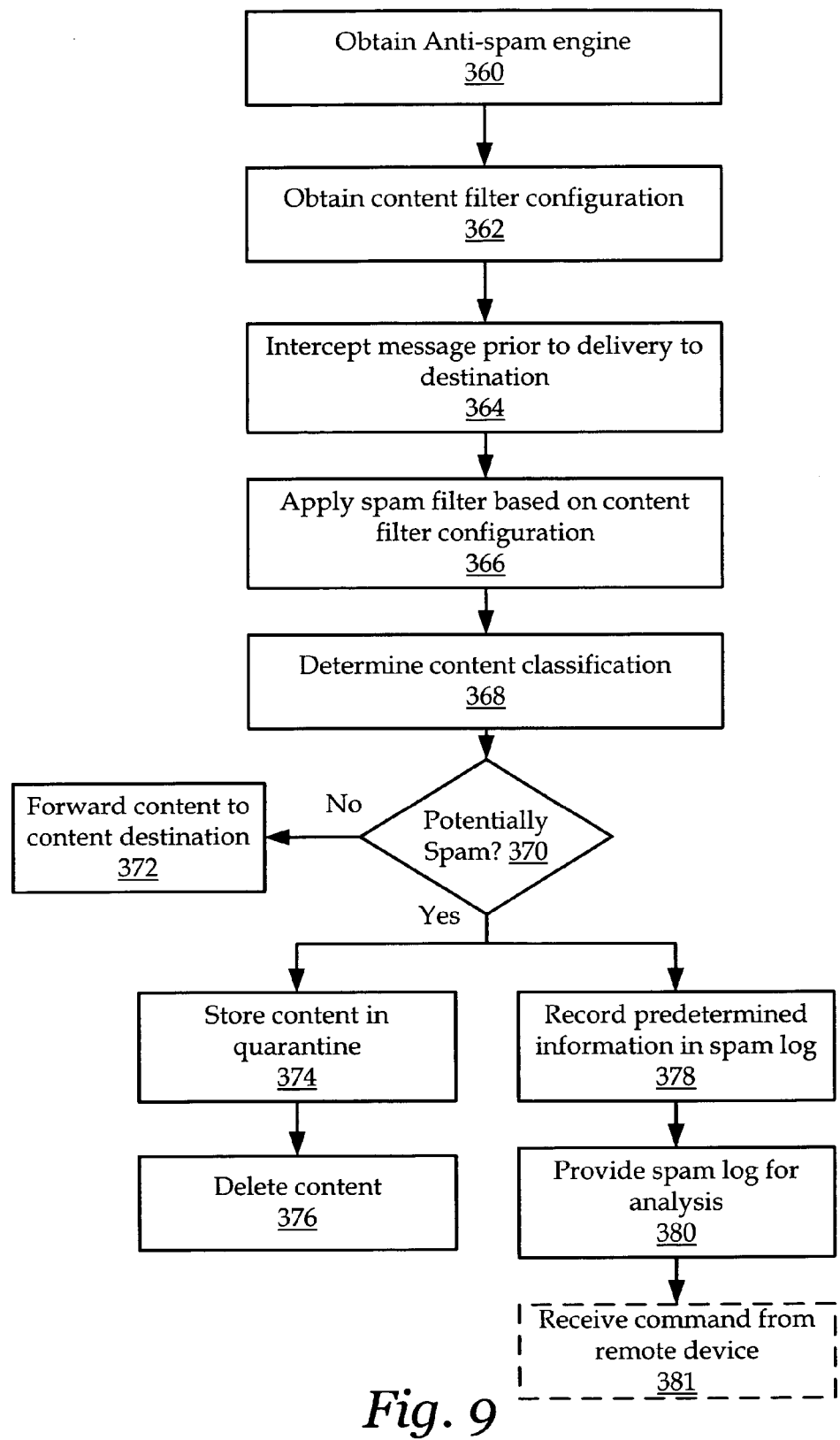
FIG. 9 is a flowchart diagram of a method for preventing unauthorized downloads to a wireless device according to the system of FIG. 1.

Referring to FIG. 9, a flowchart illustrating a method of spam detection on a wireless device may include obtaining anti-spam engine 138 at step 360. For example, the anti-spam engine module 138 may be embodied within the hardware and/or content of the wireless device 102 during the manufacture of the device 102. Alternatively, the anti-spam engine 138 may be "pushed" by user manager anti-spam module 190 to the wireless device 102 or "pulled" from a user manager anti-sparn module 190 by the wireless device 102 across a wireless network 101.

At step 362, content filter configuration 170 may be obtained by the wireless device 102, in a similar manner as anti-spam engine 138, and may comprise parameters defining at least one content filter 182 and reporting parameter 178.

At step 364, the method includes intercepting content 160 on the wireless device 102 prior to delivery to a content destination. For example, content 160 may be intended for at least one client application 140 resident on wireless device 102, i.e., browser client, IM client, SMS client, MMS client, and E-mail client, is intercepted prior to delivery to the intended client application. In other embodiments, content 160 may be generated on the wireless device and is intercepted prior to being transmitted by communications module 152 to another device on network 101.

At step 366, at least one filter 182 may be applied to the content 160. For example, the filter may be any spam filtering mechanism 182, such as: a host-based filter; rule-based filter, i.e., filtering out content having a size greater than a user determined size, where the filter may be specific to a given network carrier; Bayesian statistical filter; noise filter; and Sender Policy Framework ("SPF") or Sender Identification (ID) filter. At step 368, content filter test result 174 is determined based upon the application of the at least one filter 182 to the content 160. The calculated filter test result 174 may be a value that when compared to predetermined filter test result 188 at step 370, is operable to determine whether the content 160 is spam.

If the content classification indicates that the content 160 is not spam, the content may, at step 372, be forwarded to the respective content destination 172, which may be a wireless device resident client application or another network device. Alternatively, if the content classification indicates that the content 160 is likely spam, the content is not forwarded to the intended client application. Furthermore, the content 160 may, at step 374, be stored in quarantine folder 163 as spam content 163 until such time or other predefined condition when the spam content 163 may be deleted at step 376. The predefined condition, such as storage limit 176, may be obtained from the content filter configuration 170. Furthermore, storing and deleting the quarantined content 163 may be accomplished under control of a control command 185 as part of the local device control module 183.

In addition, upon determination of content 160 as spam at step 370, a record may be entered into spam log 184 at step 378, comprising at least a portion 173 of content 160, for example, content destination 172 and the source 186 of the content, and the calculated filter test result 188. The spam log 184 may then, at step 380, be provided to a remote device, such as the user manager 110 and the operator position 114 for further analysis.

At step 381, a message may be received by the wireless device 102 in response to the transmitted spam log 184. For example, the message may comprise a control command 185 instructing the wireless device 102 to receive and upload an update to content filter configuration 170.

Figure 10:
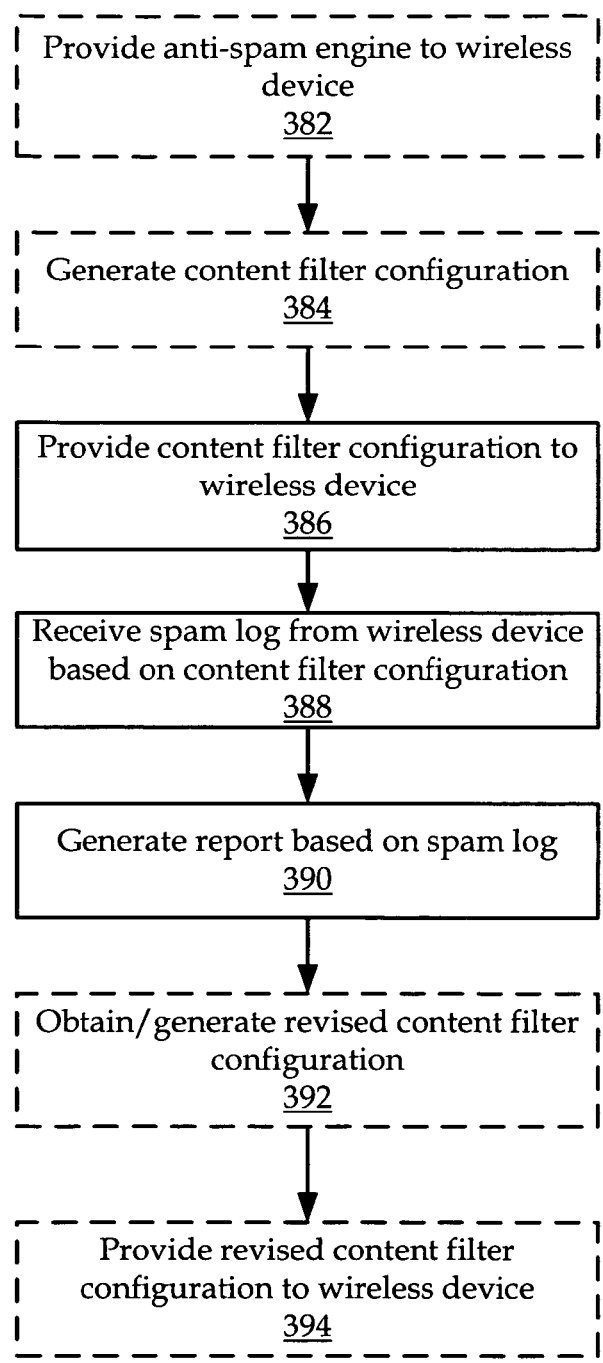
FIG. 10 is another flowchart diagram of a method for preventing unauthorized downloads to a wireless device according to the system of FIG. 1.

FIG. 10 illustrates a flowchart of one aspect of a method, operable on a network device such as user manager 110, to manage content on a wireless device. In one aspect the method includes, at step 382, providing an anti-spam engine to a wireless device. In one example, user manager 110 may wirelessly transmit anti-spam engine 138, stored in the memory of the user manager, to the wireless device 102 over wireless network 101.

The method further includes, at step 384, generating a content filter configuration to the wireless device. For example, the user manager 110 may generate content filter configuration 170. The user manager 110 may generate the filter configuration 170 upon request from at least one of the wireless device 102, the operator 114 or the user manager anti-spam logic 192. The filter configuration 170 may be generated by the configuration generator module 198 based upon the parameters and logic shown in FIG. 5. At step 386, the content filter configuration 170 may be provided to the wireless device 102. In one example, user manager 110 may transmit configuration 170 to wireless device 102 over network 101.

At step 388, the method includes receiving a spam log from the wireless device based on the content filter configuration. In one example, the user manager 110 may receive at least one spam log 184 generated by at least one wireless device 102 by applying content filter configuration 170 to content 160, and transmitted over wireless network 101. The spam log 184 may be stored in information repository 194 where it may be further analyzed by analyzer 202, which may include hardware and analysis logic, such as decision-making routines, statistical programs, and combinations thereof, for analyzing and interpreting logs 184.

Based upon a result of the spam log analysis, the user manager 110 may, at step 390, generate a report 205 and make this report available to an operator 114. The report 205 may be made viewable on the user manager by an authorized user such as operator 114, or the user manager 110 may transmit at least portions of the report 205 over network 101 to the operator 114 as an E-mail.

Based upon an analysis of the spam log 184, either by an operator 114 or by the analyzer 202, the user manager 110 may, at step 392, either generate or receive a revised content filter configuration 170. Prior to accepting the content filter configuration 170 transmitted by the operator position 114, the remote device control module 200 of the user manager 110 is operable to verify the authorization of the operator 114 to update the configuration of the wireless device 102.

The revised content filter configuration 170 may be made available to the wireless device 102 and/or the message center 118 at step 394. All or some portion of the filter configuration 170 may be transmitted to the wireless device 102 and/or the message center 118 over the wireless network 101. In some cases, the wireless device 102 may request authorization confirmation prior to accepting the revisions and the confirmation may be provided by control command 185 generated by the remote device control module 200.

Figure 11:
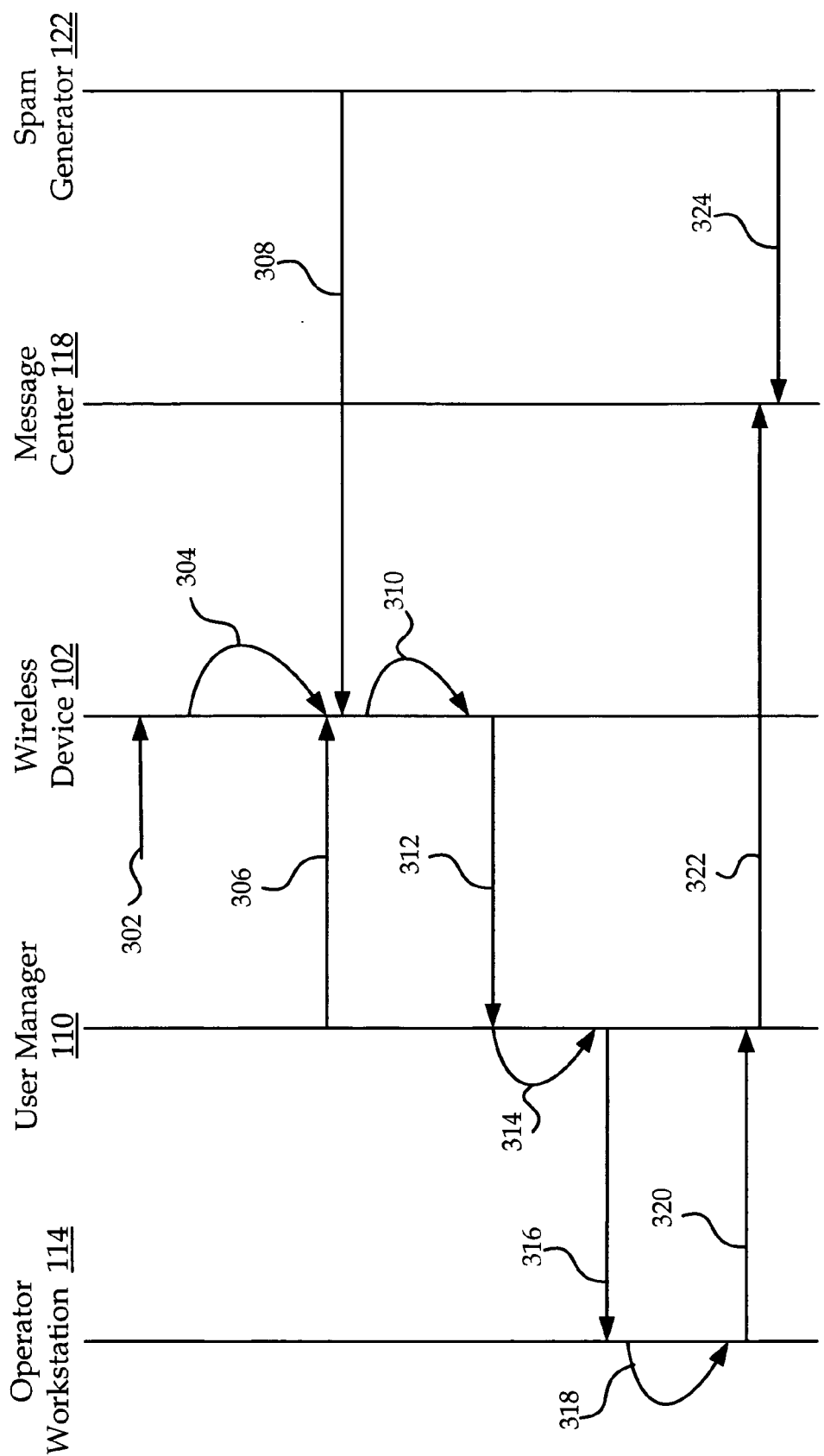
FIG. 11 is an event sequence diagram operable in some embodiments of the system of FIG. 1.

Referring to FIG. 11, some embodiments of a method of spam detection on a wireless device 102 may include receiving, at step 302, at least a portion of an anti-spam engine 138 onto wireless device 102. For example, the anti-spam engine module 138 may be embodied within the hardware and/or content of the wireless device 102 during the manufacture of the device 102. Alternatively, the anti-spam engine 138 may be "pushed" by user manager anti-spam module 190 to the wireless device 102 or "pulled" from a user manager anti-spam module 190 by the wireless device 102 across a wireless network 101 depending, for example, on whether or not the wireless device 102 has the latest version of the anti-spam engine module 138 for the respective wireless device 102. The pushing or pulling of the anti-spam engine 138 to the wireless device 102 may be configurable in any manner, for example: being initiated by a predetermined event.

When activated, in some embodiments, anti-spam engine 138 may have a rudimentary content filter configuration 170. In some embodiments, a user may further configure the anti-spam engine 138 by means of input mechanism 132 and UI 166 at step 304. Alternatively, a new and/or updated content filter configuration 170 may be "pushed" by a user manager anti-spam module 190 to the wireless device 102, or may be "pulled" from a user manager anti-spam module 190 by the wireless device 102, across wireless network 101 at step 306. The loading and activation of configuration 170 may be initiated in any manner, for example, by ad hoc request by the user, by a predetermined event, such as activation, power up, and a predetermined schedule.

After configuration, the anti-spam engine 138 may, at step 310, operate on wireless device 102 as a background process, processing at least a portion of an incoming content received by communications module 152 and stored in memory. The content may be received, at step 308, from a spam generator 122. Although the statistic collector/reporter 168 may apply a common filter 182 to all content types, in some embodiments, the statistic collector/reporter 168 may determine a client identification 172 associated with each content 160 and apply the corresponding filter 182 to each content 160 based on the given content filter configuration 170. Configurable client identifications may include, but are not limited to browser, SSM, MMS, IM, and E-mail clients. Based upon a result of applying rules comprising the applied filter, that is, a "filter result", some content may be forwarded to their intended client while other content may be classified as spam and stored in quarantine folder 164.

In some aspects, the filter result 188 may result in a calculated value that when compared to a predetermined filter test value 174 is operable to determine whether the content is authorized or is to be classified as spam.

Depending upon the at least one spam-filter 182 and the parameters of the content filter configuration file 170, the anti-spam engine 138 may be operable to detect received spam, quarantine the spam in quarantine folder 164, and create a log entry in log 184. The log entry, configurable and non-limiting, may comprise the spam content 163 and/or additional information, such sender information 186, filter result 188 derived by applying content filter 182 to the received content, etc.

Furthermore, unauthorized content 163 stored in the quarantine folder may be removed based on the storage limit parameter 176.

Based upon reporting parameters 178, log 184 may, at step 312, be uploaded to user manager anti-spam module 190. Such a mechanism may include a standard HTTP, an FTP, or other data transfer protocol. In other embodiments, the collected log file 170 may be uploaded using any communication means the wireless device 102 may access.

At step 314, user manager anti-spam module 190 may store spam log 184 in information repository 194, analyze the contents of the spam log, and generate a report 205 based upon that analysis.

At step 316, the user manager anti-spam module 190 may transmit the report 205 to an operator workstation 114 for further analysis and action. Report 205 may include any form of output that represents analysis of log 184 and other information contained in the information repository 194, as well as any other associated information such as reports of spam, new filtering techniques, etc.

Although user manager anti-spam module 190 may generate report 205, the user manager 110 and its corresponding components may be operable to present a view of spam related information collected from the wireless device 102 in any form, such as tables, maps, graphics views, plain text, interactive programs or web pages, or any other display or presentation of the data. For example, user manager anti-spam module 190 may present content authorization related information on a monitor or display device, and/or may transmit this information, such as via electronic mail, to another computer device for further analysis or review through such mechanisms as through a standard HTTP, an FTP, or some other data transfer protocol.

At step 318, an authorized user of operator workstation 114 may analyze report 205 and decide, for example, to contact message center 118. In one aspect, the operator workstation 114 may transmit, at step 320, an appropriately composed message to the user manager 110, to be forwarded, at step 322, to the message center 118. In an alternate embodiment, the operator workstation may send a message directly to the message center 118. Such a message may be in any format suitable to both the sender and receiver, including, but not limited to, E-mail, SMS text messaging, and telephonic communication.

Based upon the received message from the operator, the message center 118 may update its own filters and at step 324, block future content from spam generator 122.

Figure 12:
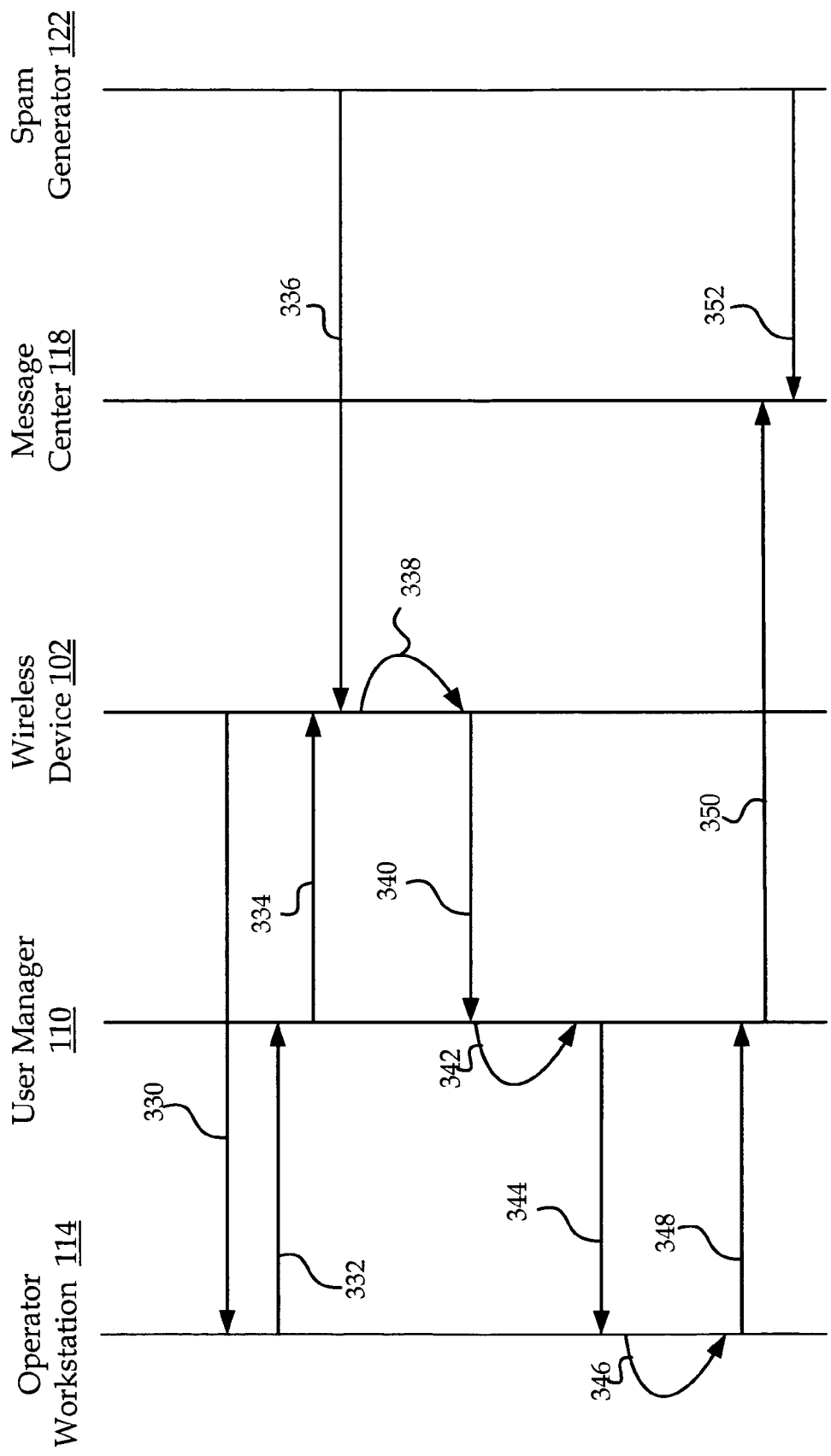
FIG. 12 is another event sequence diagram operable in some embodiments according to the system of FIG. 1.

FIG. 12 represents an additional aspect of the herein disclosed system 100, in which a user of wireless device 102, upon receiving spam on at least one of their wireless device resident client applications, contacts, at step 330, operator 114 regarding the accrued charges due to the unsolicited content ("spam"). As disclosed above, the communication between the user and the operator may be by electronic message or by real-time voice communication.

The wireless device 102 may require a download of the anti-spam module 138 or may simply require an update to the content filter configuration file 170. At step 332, the operator workstation 114 is operable to transmit a message to the user manager 110 requesting the user manager module 190 to "push," at step 334, anti-spam module 138 and/or a content filter configuration file 170 to the wireless device 102.

Further at step 334, a control command 185 may be generated by the operator workstation 114 and be forwarded to the wireless device 102. The control command 185 may operate to verify the authenticity and authorization of the operator/user manager to command the wireless device 102 to perform a specific action. In one non-limiting aspect, remote device control module 200 may execute permission logic 236 to make permission decision 222 as to whether or not to relay an operator generated control command 185 to a specific wireless device 102.

Whether or not the operator workstation 114 had initiated a download of the anti-spam engine 138 and/or the content filter configuration file 170, new unauthorized or junk content, received by the wireless device 102 at step 336, may, at step 338, be filtered and prevented from reaching their targeted client. In addition, the filtered content are logged in log file 170, which, based upon reporting parameters 178, may be uploaded to user manger 110 for analysis at step 340. Similar to the message sequence of FIG. 9, a report 205 may be generated by the user manager 110 at step 342 and forwarded to the operator workstation 114 at step 344.

Steps 346, 348, 350 and 352 of FIG. 12, operating similarly to steps 318, 320, 322 and 324 of FIG. 11, enable the user of operator workstation 114 to analyze spam report 205 and take the appropriate steps to have the message center 118 block similar spam attacks from clogging network 101.

In another aspect (not shown), upon a user complaint, the operator workstation 114 may simply send a request to the wireless device 102 to upload the current log 184 and/or upload the currently active configuration 170 without updating the content filter configuration file 170, in order to determine the current level of spam protection on the wireless device 102.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of providing an anti-spam module to monitor all content incoming to a wireless device prior to being received by any client application, comprising:
intercepting content on the wireless device prior to delivery of the content to a content destination and prior to delivery to a client application resident on the wireless device;
analyzing the content based on a content filter to determine if the content comprises unwanted content and if the content is determined to comprise unwanted content, a record is entered into a spam log, wherein the content filter is selected from a plurality of content filters based on a network service provider of the wireless device, and at least one of a hardware characteristic associated with the wireless device, a predetermined characteristic associated with the content destination, and a hardware requirement associated with the content;
based upon the analyzing of the content, forwarding the content to the content destination or quarantining the content by the wireless device;
storing predetermined information of the content including storing at least one of a portion of the content, an identification of a source of the content, a calculated filter test result associated with the content, and an identification of the content destination; and
transmitting the predetermined information to a remote device for analysis of the predetermined information.

2. The method of claim 1, wherein forwarding further comprises forwarding the content to at least one of a browser client, an Internet Messenger client, a short message service (SMS) client, a multimedia message service (MMS) client, and an E-mail client.

3. The method of claim 1, wherein intercepting further comprises intercepting prior to transmitting the content from the wireless device to a wireless network.

4. The method of claim 1, wherein the hardware characteristic comprises at least one of a processor capability, a speaker capability, a ringer capability, a display capability, and a memory capability.

5. The method of claim 1, wherein the predetermined characteristic of the content destination comprises at least one of an identification of a destination client application resident on the wireless device, and a number content destinations associated the content.

6. The method of claim 1, wherein the hardware requirement comprises at least one of a wireless device processor requirement, a wireless device audio component requirement, a wireless device video component requirement, and a wireless device memory component requirement.

7. The method of claim 1, wherein quarantining further comprises deleting the content based on a storage limit parameter.

8. The method of claim 1, further comprising receiving the content filter from across a wireless network.

9. The method of claim 1, further comprising receiving a reporting parameter of the content filter, wherein transmitting the predetermined information further comprises transmitting based on the reporting parameter.

10. The method of claim 1, wherein transmitting the predetermined information further comprises establishing a limited-access communications channel across a wireless network based on a predefined limited service configuration.

11. The method of claim 1, wherein analyzing further comprises:
    applying the content filter to the content;
    calculating a filter test result based upon application of the predetermined content filter to the content;
    comparing a calculated filter test result to a predetermined filter test result; and
    classifying the content as unwanted content based upon the comparison of the calculated filter test result and the predetermined filter test result.

12. The method of claim 1, further comprising receiving a revised content filter based on analyzing the content, and replacing the content filter with the revised content filter.

13. The method of claim 1, wherein intercepting further comprises intercepting content received at a predetermined port of the wireless device.

14. The method of claim 1, wherein intercepting content further comprises initiating the content filter on the wireless device, wherein initiating includes at least one of an ad hoc request by a user or a predetermined event, wherein the predetermined event includes at least one of:
    activation, or power up, or a predetermined schedule.

15. A tangible non-transitory computer readable medium comprising instructions when executed by a computer to cause the computer to perform operations of providing an anti-spam module to monitor all content incoming to a wireless device prior to being received by any client application, comprising:
    intercepting content on a wireless device prior to delivery of the content to a content destination wherein intercepting content on a wireless device further comprises intercepting prior to delivery of the content to a content destination;
    analyzing the content based on a content filter to determine a content classification, wherein the content filter is selected from a plurality of content filters based on a network service provider of the wireless device, and at least one of a hardware characteristic of the wireless device, a predetermined characteristic associated with the content destination, and a hardware requirement of the content;
    based upon the content classification, forwarding the content to the content destination or quarantining the content by the wireless device;
    storing predetermined information of the content including storing at least one of a portion of the content, an identification of a source of the content, a calculated filter test result associated with the content, and an identification of the content destination; and
    transmitting the predetermined information to a remote device for analysis of the predetermined information.

16. A wireless device for providing an anti-spam module to monitor all content incoming to a wireless device prior to being received by any client application; comprising:
    means for intercepting content on the wireless device prior to delivery of the content to a content destination;
    means for analyzing the content based on a content filter to determine a content classification wherein the content filter is selected from a plurality of content filters based on a network service provider of the wireless device, and at least one of a hardware characteristic of the wireless device, a predetermined characteristic associated with the content destination, and a hardware requirement of the content;
    means for forwarding the content to the content destination or quarantining the content, based upon the content classification by the wireless device;
    means for storing predetermined information of the content including storing at least one of a portion of the content, an identification of a source of the content, a calculated filter test result associated with the content, and an identification of the content destination; and
    means for transmitting the predetermined information to a remote device for analysis of the predetermined information.

17. A wireless device for providing an anti-spam module to monitor all content incoming to a wireless device prior to being received by any client application, comprising:
    an anti-spam engine operable to intercept content on the wireless device prior to delivery of the content to a content destination, the anti-spam engine comprising a content filter selected from a plurality of content filters based on a network service provider for the wireless device, and at least one of a hardware characteristic for the wireless device, a predetermined characteristic of the content destination, and a hardware requirement for the content; and
    control logic intercommoned with the anti-spam engine and operable to apply the content filter to the content and determine if the content comprises unwanted content, wherein the control logic is further operable to forward the content to the content destination if the content does not comprise unwanted content or quarantine the content if the content comprises unwanted content;
    wherein the anti-spam engine is further configured to store predetermined information of the content including storing at least one of a portion of the content, an identification of a source of the content, a calculated filter test result associated with the content, and an identification of the content destination; and
    wherein the wireless device is configured to forward the predetermined information to a remote device for analysis of the predetermined information.

18. The wireless device of claim 17, further comprising a memory module operable to store at least one client application, and wherein the content destination comprises the client application.

19. The wireless device of claim 18, wherein the control logic is further operable to forward the content to at least one of a browser client, an Internet Messenger client, a short message service (SMS) client, a multimedia message service (MMS) client, and an E-mail client.

20. The wireless device of claim 17, further comprising a memory module operable to store at least one client application operable to generate the content, and wherein the content destination comprises a destination wirelessly connectable with the wireless device.

21. The wireless device of claim 17, wherein the hardware characteristic comprises at least one of a processor capability, a speaker capability, a ringer capability, a display capability, and a memory capability.

22. The wireless device of claim 17, wherein the predetermined characteristic associated with the content destination comprises at least one of an identification of a destination client application resident on the wireless device, and a number content destinations associated the content.

23. The wireless device of claim 17, wherein the hardware requirement comprises at least one of a wireless device processor requirement, a wireless device audio component requirement, a wireless device video component requirement, and a wireless device memory component requirement.

24. The wireless device of claim 17, further comprising a memory module operable to store a quarantine log and a storage limit parameter, wherein the control logic is further operable to store the content in the quarantine log based on a storage limit parameter.

25. The wireless device of claim 17, further comprising a memory module operable to store a spam log, wherein the control logic is further operable, if the content comprises unwanted content, to store predetermined information associated with the content in the spam log and transmit the spam log to a remote device for analysis of the predetermined information.

26. The wireless device of claim 25, wherein the control logic is operable to generate a calculated filter test result based on the application of the content filter to the content, and wherein the predetermined information further comprises at least one of a portion of the content, an identification of a source of the content, the calculated filter test result associated with the content, and an identification of the content destination.

27. The wireless device of claim 25, wherein the memory module further comprises a reporting parameter associated with the content filter, and wherein the control logic is further operable to transmit the predetermined information based on the reporting parameter.

28. The wireless device of claim 25, wherein the memory module further comprises a limited service configuration, and wherein the anti-spam engine is further operable to transmit the predetermined information by establishing a limited-access communications channel across a wireless network based on the limited service configuration.

29. The wireless device of claim 17, wherein the anti-spam engine is further operable to receive the content filter from across a wireless network.

30. The wireless device of claim 17, further comprising a memory module operable to store a predetermined filter result corresponding to the content filter, wherein the control logic is further operable to apply the content filter to the content to generate a filter test result, compare the calculated filter test result to the predetermined filter test result, and classifying the content as unwanted content based upon the comparison of the calculated filter test result and the predetermined filter test result.

31. The wireless device of claim 17, further comprising receiving a revised content filter based on analyzing the content, and replacing the content filter with the revised content filter.

32. The wireless device of claim 17, wherein the control logic is further operable to apply the content filter to a predetermined port of the wireless device.

33. The wireless device of claim 17, wherein the anti-spam engine is initiated on the wireless device by at least one of an ad hoc request by a user or a predetermined event, wherein the predetermined event includes at least one of:
activation, or power up, or a predetermined schedule.

34. A method for managing filtering of content on a wireless device to provide an anti-spam module to monitor all content incoming to a wireless device prior to being received by any client application, comprising:
providing a predetermined content filter storable on the wireless device and a reporting parameter to the wireless device, wherein the content filter is selectable from a plurality of content filters based on a network service provider for the wireless device, and at least one of a hardware characteristic for the wireless device, a predetermined characteristic of the content destination, and a hardware requirement for the content;
receiving, based on the reporting parameter, a spam log relating to content on the wireless device and filtered by the wireless device according to the predetermined content filter;
generating a report based on the spam log; and
storing predetermined information of the content including storing at least one of a portion of the content, an identification of a source of the content, a calculated filter test result associated with the content, and an identification of the content destination;
wherein the wireless device is configured to be able to transmit the predetermined information to a remote device for analysis of the predetermined information.

35. The method of claim 34, wherein the spam log comprises information relating to at least one of incoming content received by the wireless device and outgoing content destined for transmission from the wireless device.

36. The method of claim 34, further comprising providing a predetermined filter test result to the wireless device to enable the wireless device to determine whether to include a reference to the content in the spam log after subjecting the content to the content filter.

37. The method of claim 36, wherein the content filter, when applied by the wireless device to the content, is operable to generate a calculated filter test result for comparison with the predetermined filter test result.

38. The method of claim 34, wherein the reporting parameter is operable to define predetermined information to store in the spam log.

39. The method of claim 38, wherein the predetermined information further comprises at least one of a portion of the content, an identification of a source of the content, a calculated filter test result associated with the content, and an identification of the content destination.

40. The method of claim 34, wherein providing the predetermined content filter and the reporting parameter further comprises forwarding across a wireless network to the wireless device.

41. The method of claim 34, further comprising forwarding a revised content filter to the wireless device based on the spam log.

42. The method of claim 34, wherein the predetermined content filter filters content received at a predetermined port of the wireless device.

43. The method of claim 34, wherein providing the predetermined content filter further comprising, providing the predetermined content filter that may be initiated on the wireless device by at least one of an ad hoc request by a user or a predetermined event, wherein the predetermined event includes at least one of: activation, or power up, or a predetermined schedule.

44. A tangible non-transitory computer readable medium comprising instructions, when executed by a computer, cause the computer to perform operations to provide an anti-spam module to monitor all content incoming to a wireless device prior to being received by any client application, including:
  providing a predetermined content filter storable on the wireless device and a reporting parameter to the wireless device, wherein the content filter is selectable from a plurality of content filters based on a network service provider for the wireless device, and at least one of a hardware characteristic for the wireless device, a predetermined characteristic of the content destination, and a hardware requirement for the content;
  receiving, based on the reporting parameter, a spam log relating to content received by the wireless device and filtered by the wireless device according to the content filter;
  generating a report based on the spam log; and
  storing predetermined information of the content including storing at least one of a portion of the content, an identification of a source of the content, a calculated filter test result associated with the content, and an identification of the content destination;
  wherein the wireless device is configured to be able to transmit the predetermined information to a remote device for analysis of the predetermined information.

45. At least one processor configured to perform actions including:
  providing a predetermined content filter storable on the wireless device and a reporting parameter to the wireless device, wherein the content filter is selectable from a plurality of content filters based on a network service provider for the wireless device, and at least one of a hardware characteristic for the wireless device, a predetermined characteristic of the content destination, and a hardware requirement for the content;
  receiving, based on the reporting parameter, a spam log relating to content received by the wireless device and filtered by the wireless device according to the content filter;
  generating a report based on the spam log; and
  storing predetermined information of the content including storing at least one of a portion of the content, an identification of a source of the content, a calculated filter test result associated with the content, and an identification of the content destination;
  wherein the wireless device is configured to be able to transmit the predetermined information to a remote device for analysis of the predetermined information.

46. An apparatus for managing filtering of content on a wireless device, comprising:
  means for providing a predetermined content filter storable on the wireless device and a reporting parameter to the wireless device, wherein the content filter is selectable from a plurality of content filters based on a network service provider for the wireless device, and at least one of a hardware characteristic for the wireless device, a predetermined characteristic of the content destination, and a hardware requirement for the content;
  means for receiving, based on the reporting parameter, a spam log relating to content received by the wireless device and filtered by the wireless device according to the content filter;
  means for generating a report based on the spam log; and
  means for storing predetermined information of the content including storing at least one of a portion of the content, an identification of a source of the content, a calculated filter test result associated with the content, and an identification of the content destination;
  wherein the wireless device is configured to be able to transmit the predetermined information to a remote device for analysis of the predetermined information.

47. An apparatus for managing filtering of content on a wireless device, comprising:
  a generator module operable to generate a content filter configuration comprising at least one predetermined content filter storable on the wireless device and a reporting parameter, wherein the content filter is selectable from a plurality of content filters based on a network service provider for the wireless device, and at least one of a hardware characteristic for the wireless device, a predetermined characteristic of the content destination, and a hardware requirement for the content;
  an anti-spam module operable to forward the content filter configuration to the wireless device and operable to receive, based on the reporting parameter, a spam log relating to content received by the wireless device and filtered by the wireless device according to the spam filter; and
  a report generator operable to generate a report based on the spam log;
  wherein the anti-spam module is further configured to store predetermined information of the content including storing at least one of a portion of the content, an identification of a source of the content, a calculated filter test result associated with the content, and an identification of the content destination; and
  wherein the wireless device is configured to be able to forward the predetermined information to a remote device for analysis of the predetermined information.

48. The apparatus of claim 47, wherein the spam log comprises information relating to at least one of incoming content received by the wireless device and outgoing content destined for transmission from the wireless device.

49. The apparatus of claim 47, wherein the content filter configuration further comprises a predetermined filter test result to enable the wireless device to determine whether to include a reference to the content in the spam log after subjecting the content to the content filter.

50. The apparatus of claim 49, wherein the content filter, when applied by the wireless device to the content, is operable to generate a calculated filter test result for comparison with the predetermined filter test result.

51. The apparatus of claim 47, wherein the reporting parameter is operable to define predetermined information to store in the spam log.

52. The apparatus of claim 51, wherein the predetermined information further comprises at least one of a portion of the content, an identification of a source of the content, a calculated filter test result associated with the content, and an identification of the content destination.

53. The apparatus of claim 47, wherein the anti-spam module is further operable to forward the predetermined content filter and the reporting parameter across a wireless network to the wireless device.

54. The apparatus of claim 47, wherein the anti-spam module is further operable to forward a revised content filter configuration to the wireless device based on the spam log.

55. The apparatus of claim 47, wherein the predetermined content filter is further configured to filter content received at a predetermined port of the wireless device.

56. The apparatus of claim 47, wherein the predetermined content filter is further configured to be initiated on the wireless device by at least one of an ad hoc request by a user or a predetermined event, wherein the predetermined event includes at least one of:

activation, or power up, or a predetermined schedule.

* * * * *